United States Patent
Oh

(10) Patent No.: US 7,111,643 B2
(45) Date of Patent: Sep. 26, 2006

(54) FLOW CHARACTERIZATION IN A FLOWPATH

(75) Inventor: Michael Hung-Sun Oh, Rockford, IL (US)

(73) Assignee: Invensys Building Systems, Inc., Rockford, IL (US)

( * ) Notice: Subject to any disclaimer, the term of this patent is extended or adjusted under 35 U.S.C. 154(b) by 61 days.

(21) Appl. No.: 11/043,868

(22) Filed: Jan. 26, 2005

(65) Prior Publication Data

US 2006/0162792 A1 Jul. 27, 2006

(51) Int. Cl.
*F16K 11/087* (2006.01)
*F16K 5/12* (2006.01)

(52) U.S. Cl. ............... 137/625.41; 137/625.47; 251/118; 251/209

(58) Field of Classification Search ........... 137/625.41, 137/625.47; 251/118, 208, 209
See application file for complete search history.

(56) References Cited

U.S. PATENT DOCUMENTS

| | | | | |
|---|---|---|---|---|
| 3,023,775 | A | * | 3/1962 | Becker ................. 251/208 |
| 3,209,779 | A | * | 10/1965 | McGowen, Jr. ............ 251/118 |
| 3,446,477 | A | * | 5/1969 | Ainsworth et al. ......... 251/208 |
| 3,563,511 | A | | 2/1971 | Bentley-Leek |
| 3,630,229 | A | * | 12/1971 | Nagel et al. ............... 251/118 |
| 3,786,837 | A | | 1/1974 | Pipkins |
| 3,826,281 | A | * | 7/1974 | Clark ...................... 251/118 |
| 3,880,191 | A | | 4/1975 | Baumann |
| 4,085,774 | A | | 4/1978 | Baumann |
| 4,271,866 | A | | 6/1981 | Bey |
| 4,540,025 | A | | 9/1985 | Ledeen et al. |
| 4,889,163 | A | | 12/1989 | Engelbertsson |
| 5,074,522 | A | | 12/1991 | Reynolds et al. |
| 5,509,446 | A | | 4/1996 | Bey |
| 5,593,135 | A | | 1/1997 | Lester et al. |
| 5,937,890 | A | | 8/1999 | Marandi |
| 6,039,304 | A | | 3/2000 | Carlson et al. |
| 6,109,591 | A | | 8/2000 | Tuttle et al. |
| 6,196,262 | B1 | * | 3/2001 | Giacomini .............. 251/118 |
| 6,481,986 | B1 | * | 11/2002 | Silver et al. ............. 251/208 |
| 2001/0030309 | A1 | | 10/2001 | Carlson et al. |

OTHER PUBLICATIONS

Print out from Worcester Controls entitled "Series CPT Characterized Seat Control Valve", Copyright 2002, retrieved from http://www.worcestercc.com/controls.html on Oct. 19, 2004.

(Continued)

*Primary Examiner*—John Fox
(74) *Attorney, Agent, or Firm*—Reinhart Boerner Van Deuren P.C.

(57) ABSTRACT

An apparatus and method are provided for modifying a flow characteristic, such as a valve characteristic, through use of a flow characterizing device having a segmented flow characterizing channel therein including three or more discrete segments, at least one of which is a through-hole, for modifying a flow of fluid through a flowpath, in which the flow characterizing device is mounted, when a controlling edge, mounted in the flowpath adjacent the flow characterizing device, is aligned with one or more of the three or more discrete segments of the flow characterizing channel. Either or both of the flow characterizing channel and the controlling edge are selectively movable relative to one another.

47 Claims, 26 Drawing Sheets

OTHER PUBLICATIONS

Print out from Flowserve Corporation Investor Relations entitled "*Flowserve Completes Acquisition of IFC*", Copyright 2002, retrieved from http://www.corporate-ir.net/ireye/ir_site.zhtm1?ticker=f;s&script=410&layout=-6&item_id=289913 on Oct. 20, 2004.

Print out from Flowserve Corporation entitled "*Characterized Seat Control Valve*", retrieved from http://fed.flowserve.com/valves/products/valve.jsp?pageid=WCACPT001 on Oct. 20, 2004.

Worcester Controls, Condensed Catalog entitled"*Valve, Actuator, and Control Solutions for Critical Applications*", (CS-100-21), 1999.

Print entitled "Steam Control Valve Sizing Utility" retrieved from http://www.clabberhead.com/steamcvmain.html on Jul. 5, 2004.

"CPT The Ultimate Control Valve Brochure", Worcester Control, CV-6, 1996 by Worcester Controls Corp.

* cited by examiner

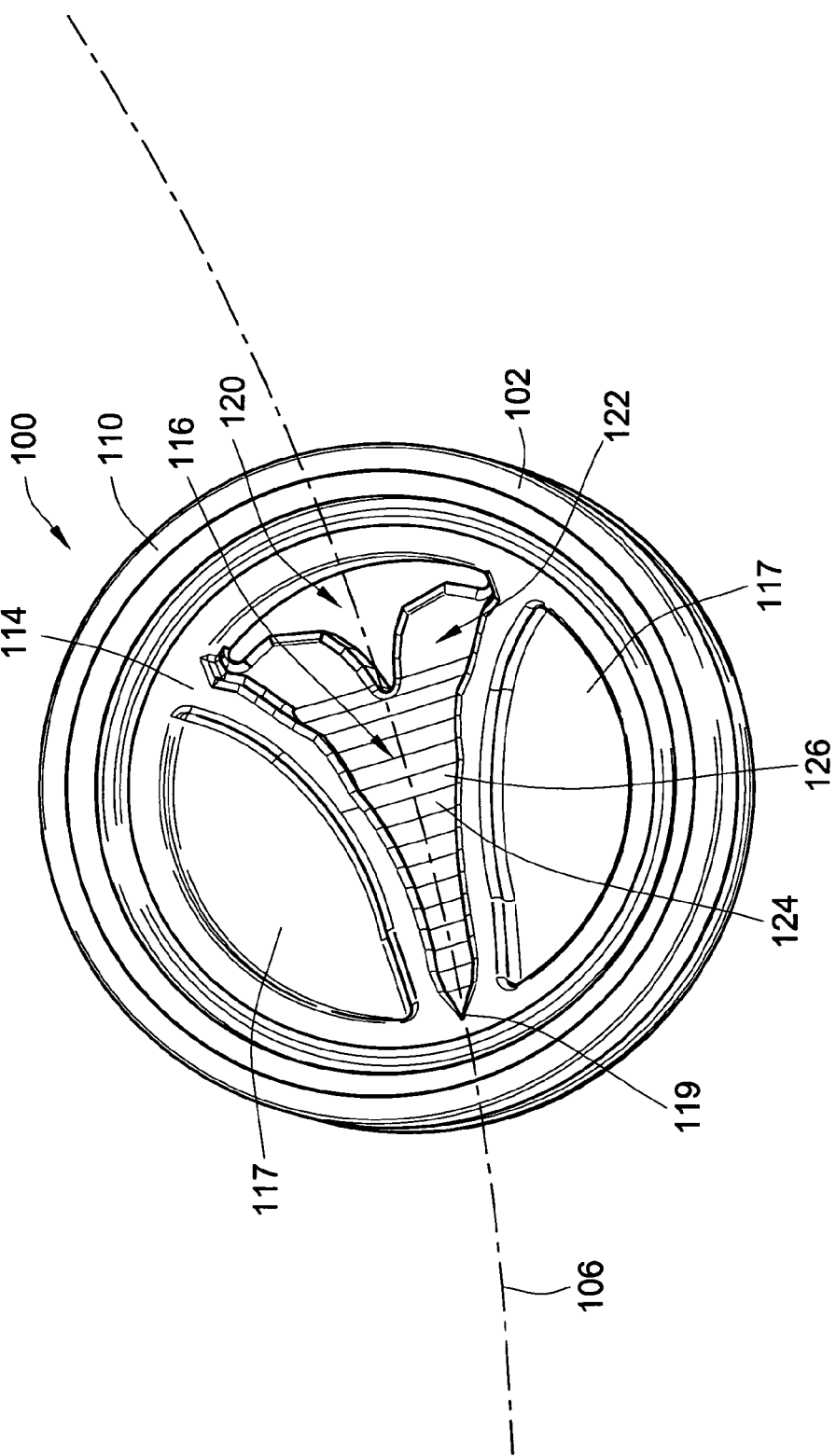

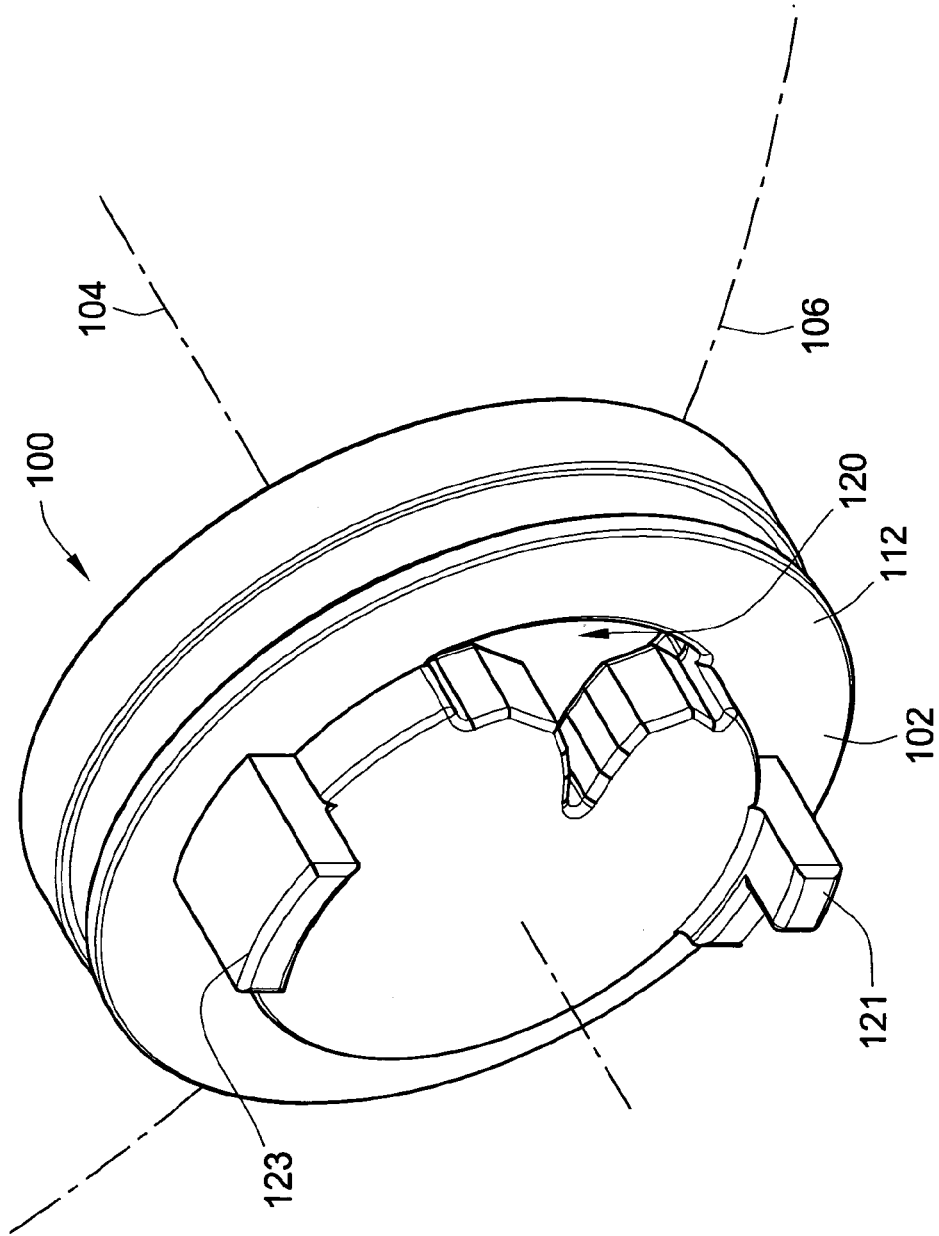

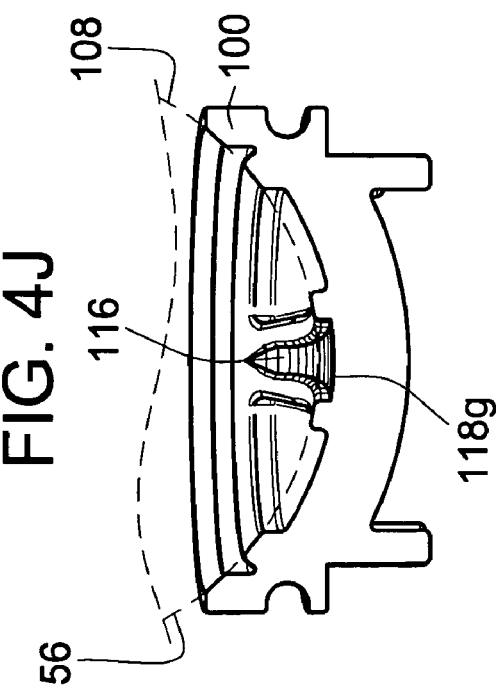
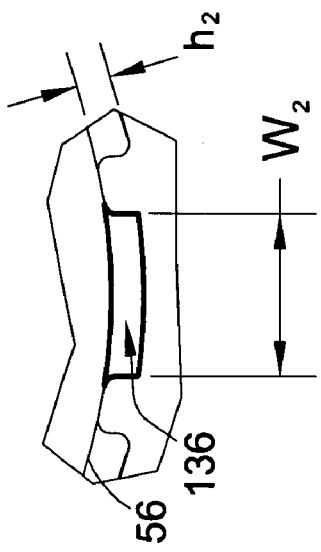
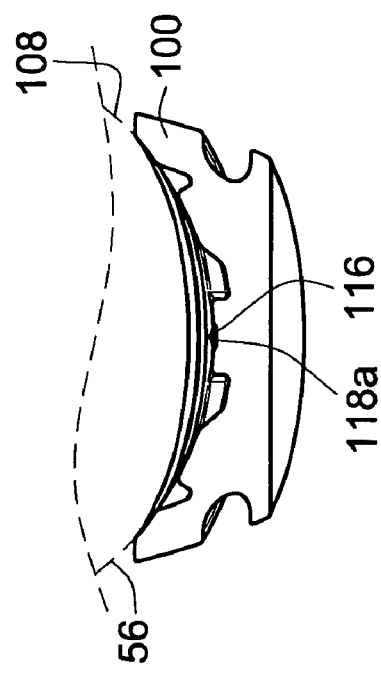
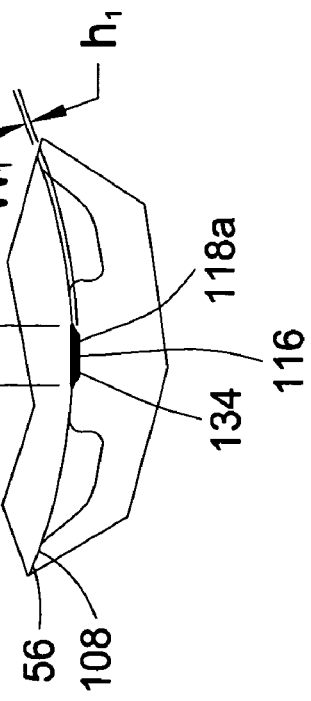

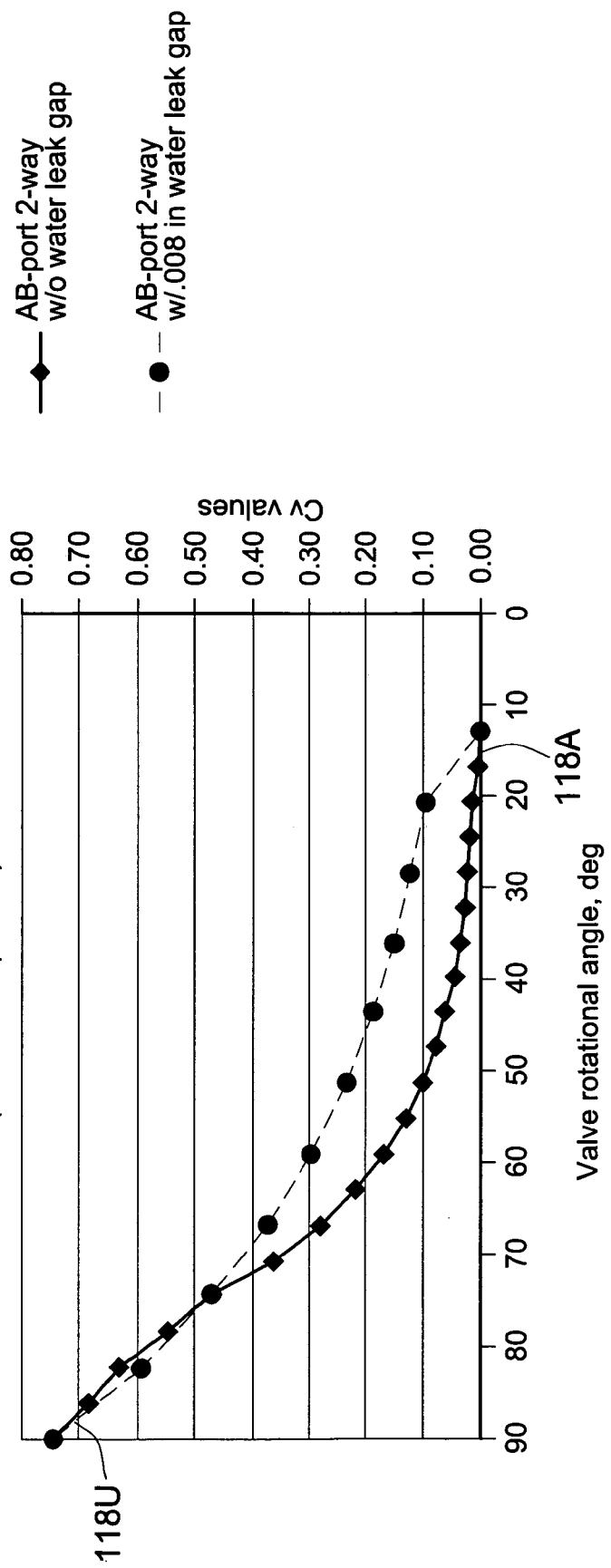

Graph : 4.7Cv flow curve for 2-way 1/2" valve (47% of full port Cv)

——— w/ .008" water leak gap

- - - - w/o water leak gap

FIG. 6E Graph 4: 7.4Cv flow curve for 2-way 1/2" valve (74% of full port Cv)

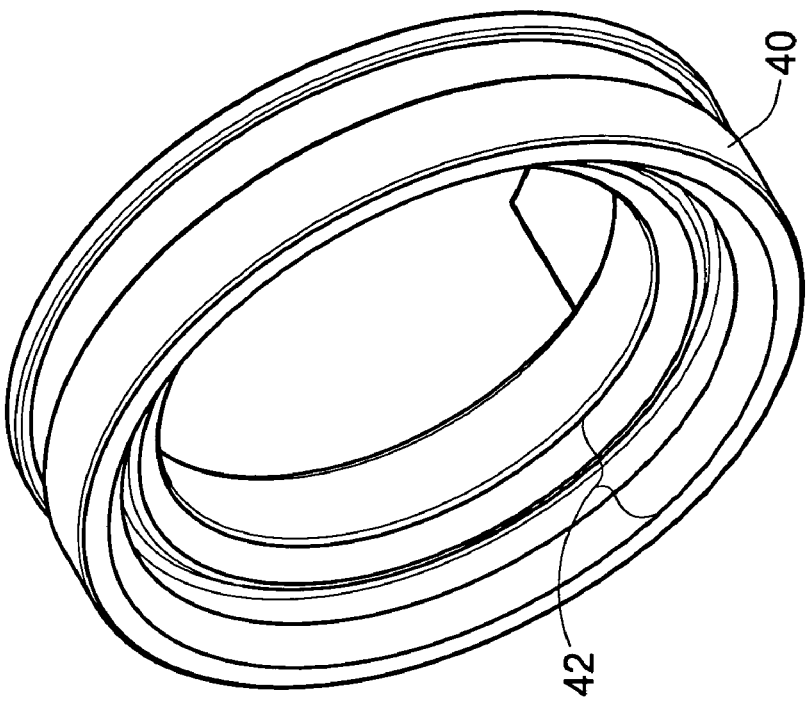
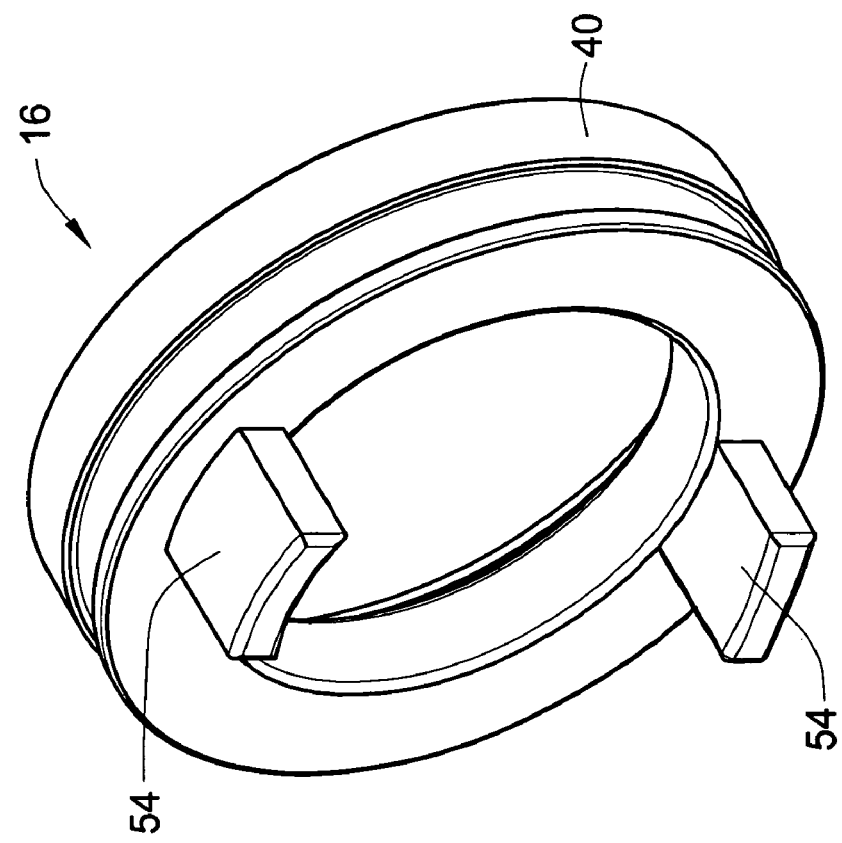

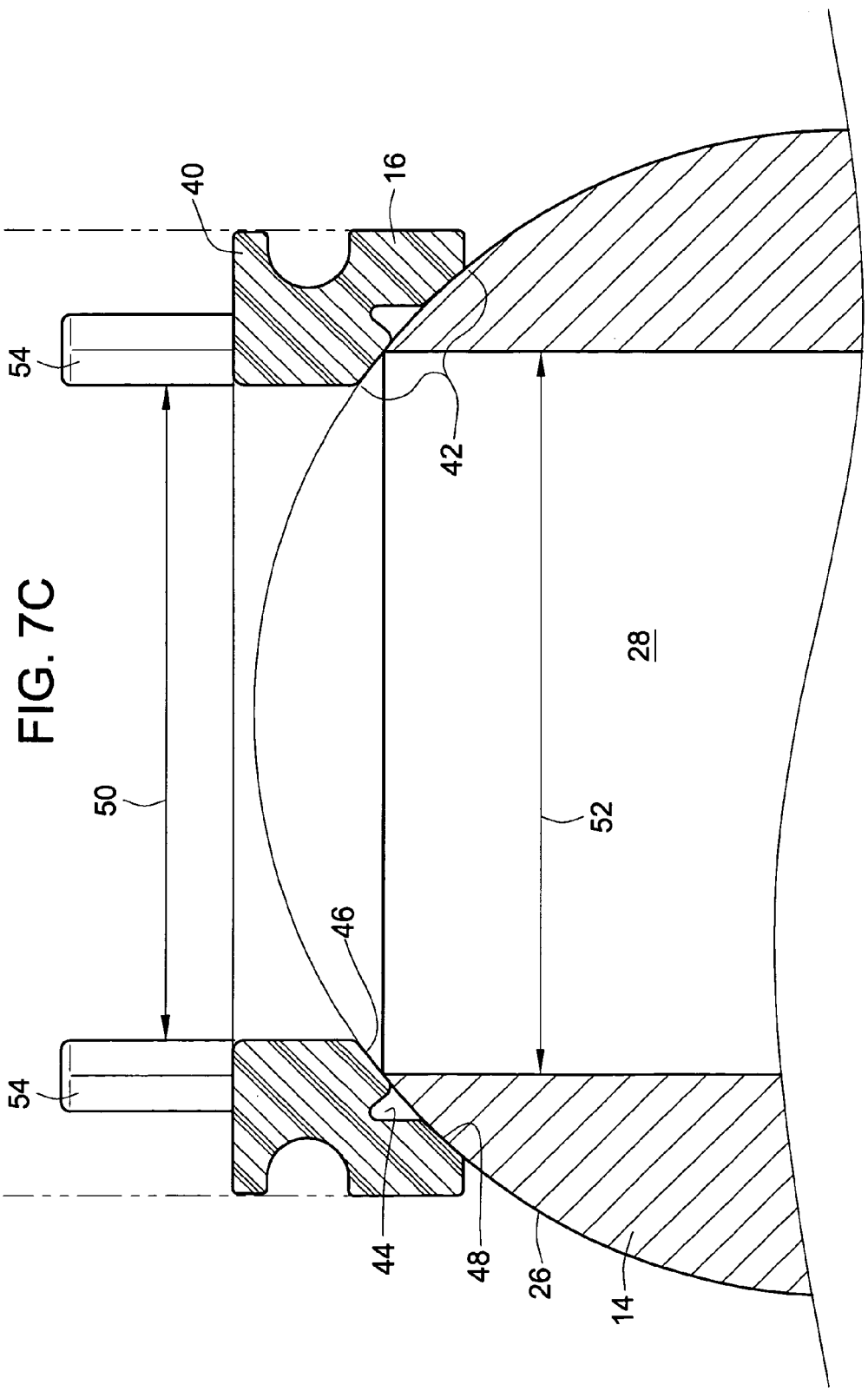

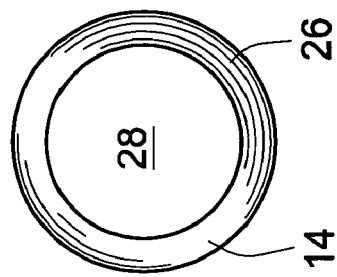
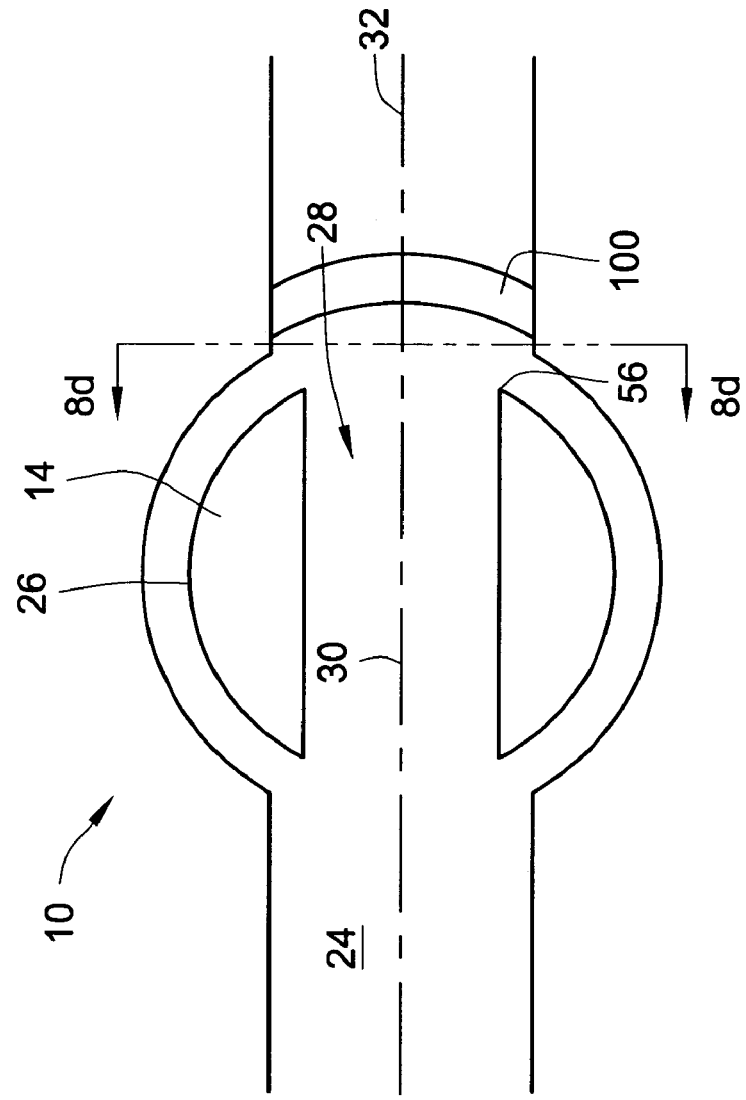

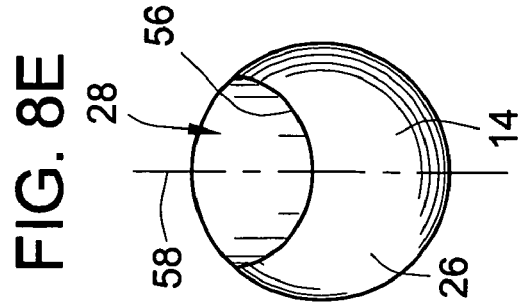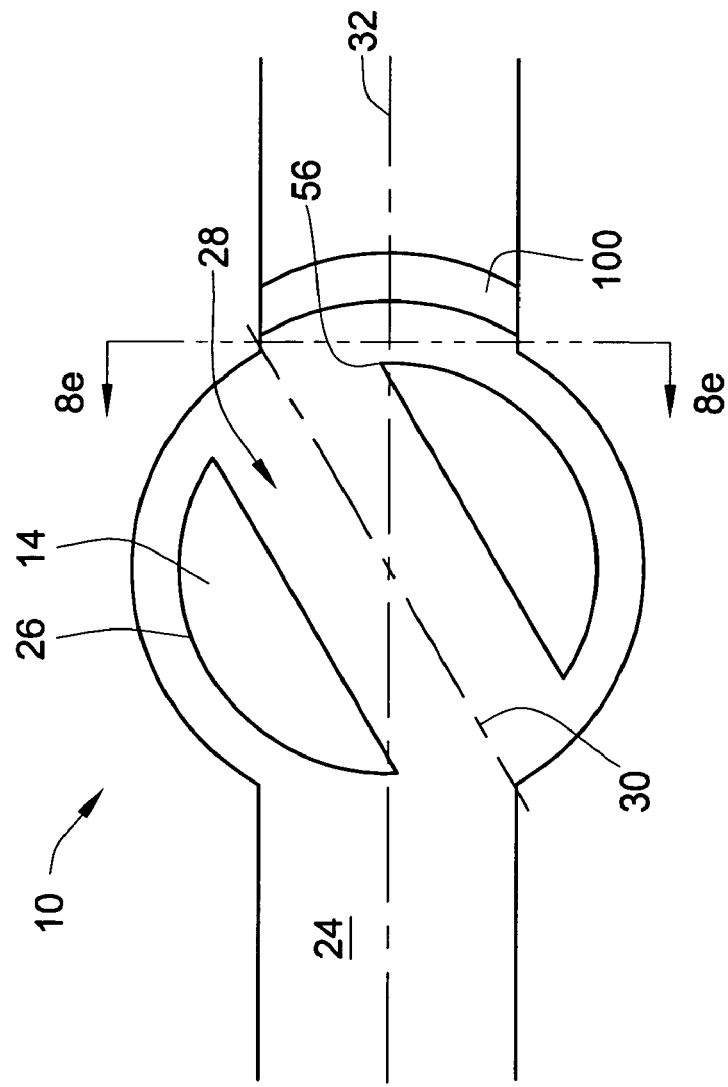

FLOW CHARACTERIZATION IN A FLOWPATH

FIELD OF THE INVENTION

This invention relates to modifying fluid flow through a flowpath, such as is found in fluid control devices including ball valves, and more particularly to an apparatus and method for modifying the fluid flow characteristics of such fluid control devices.

BACKGROUND OF THE INVENTION

In many types of fluid systems, it is necessary to modulate or otherwise control a flow of fluid through a fluid circuit. For example, heating ventilation and air conditioning (HVAC) systems for building typically include multiple fluid circuits providing heated or chilled water to heat exchangers within the building. The flow of fluid in the circuits is generally modulated by one or more valves in each fluid circuit, which are operatively connected to and controlled by a control device, such as a thermostat, to provide a flow of fluid to the heat exchangers which will result in a desired temperature being maintained in inside the building.

As part of the process of selecting a control valve for use in a particular fluid system, the relationship between the effective flow area of the control valve, relative to the degree of opening, is known as the "valve characteristic." For valves used in HVAC systems, it is typically desirable to have a so-called "equal percentage" valve characteristic, over a desired range of fluid flows. In a valve exhibiting equal percentage characteristics, a change in the degree of opening of the valve (as a percentage) with respect to a previous given degree of opening, will result in an equal percentage change in fluid flow over the fluid flow at the previous given degree of opening. For example, if opening the valve by an additional 10% causes a corresponding 10% increase in fluid flow, the valve exhibits equal percentage characteristics. A valve with equal percentage flow characteristics increases fluid flow at a very low rate when the valve first begins to open, and then, as the degree of opening becomes larger, the rate of increase in fluid flow for an incremental increase in opening becomes larger.

It is understood by those having skill in the art, however, that, while having a valve providing a true equal percentage valve characteristic is a desirable theoretical goal, most actual control valves do not inherently exhibit such characteristics over their entire operating range. For example, although it is often desirable to use ball valves in such HVAC systems, for various reasons including reliability, small size and relatively low cost, the valve characteristics of ball valves are not generally inherently well suited for use in HVAC applications.

A typical ball valve includes a valve member, generally in the form of a spherical ball, which is rotatably mounted between two seals in a valve housing. The valve housing defines a flowpath extending upstream and downstream from the valve member, and the valve member includes a bore extending therethrough that can be selectively aligned with the flowpath for regulating fluid flow through the flowpath.

Both the bore through the valve member, and the flowpath in the housing typically have circular cross sections. As the valve member is rotated through an angle of 90 degrees, the bore moves from a fully open position, in which the bore is fully aligned with the flowpath, to a fully closed position, in which the bore extends perpendicularly to the flowpath, with both ends of the bore located between the two seals, so that no fluid can flow through the ball. As the bore opens, a leading edge of the bore forms a controlling edge of the outer surface of the ball, which moves transversely across the flowpath as the valve member is moved from the fully closed toward the fully open positions.

The transverse position of the controlling edge in the flowpath defines an effective axially opening area of the flowpath, which appears in cross section to be generally "football shaped" having two oppositely pointing ends joined by a pair of oppositely outwardly curved edges which form a shape that is wider in the middle than at the pointed ends. As the controlling edge moves transversely to the flowpath, the football shaped area opens and closes rather rapidly, as the ball is rotated, particularly when the valve first begins to open.

Although this rapid change in area is a desirable characteristic in ball valves used in on-off type applications, where the ball valve is simply moved from the fully open position to the fully closed position, such rapid changes in cross sectional area are not typically desirable in applications, such as HVAC systems, where the ball valve is to be used for modulating fluid flow at partially open positions of the valve. This rapid change in area also does not provide a desired equal percentage flow characteristic over any portion of the operating range of the ball valve, between the fully open and fully closed positions, making a ball valve an inherently poor choice for use as a modulating valve in an HVAC system.

Through the years, however, manufacturers of ball valves have learned that by adding a flow characterizing device adjacent to the valve member of the ball valve, or within the bore of the valve member, the inherent flow characteristics of the ball valve can be modified to provide significantly improved performance in ball valves used as modulating control valves in HVAC systems. Through the use of such flow characterizing devices, an equal percentage valve characteristic can be sometimes be provided over at least a portion of the operating range of the ball valve.

Prior flow characterizing devices have often included a wall, extending across the flowpath, having a surface that is configured to closely conform to the outer surface of the valve member. The wall includes a specially shaped opening, that restricts the cross sectional area for fluid flow, to less than that which would otherwise be inherently presented by the degree of alignment of the bore in the valve member with the flowpath, in such a manner that the rapidly opening and closing characteristics of the ball valve are modified to provide a flow characteristic that better resembles a theoretical equal percentage flow characteristic, or some other flow characteristic which may be more desirable for a particular application than the inherent rapid opening and closing characteristic of a ball valve that does not include a flow characterizing device.

Through the years, prior flow characterizing devices have utilized single or multiple openings in a wide array of shapes and sizes extending through the wall. Where it is desired to provide an equal percentage characteristic over at least a portion of the valve operational range, a single elongated opening has often been utilized, with the elongated opening extending transversely across the flowpath from an apex located near the fully closed position of the controlling edge, (i.e. the point at which the bore in the valve member first begins to open or is fully closed) to an opposite, considerably wider, end of the elongated opening that is located near the fully open position of the controlling edge.

Between the apex and the opposite end, the sidewalls of the elongated opening have taken many shapes, through the years, in prior valve characterizing devices. In an early approach, as exemplified by U.S. Pat. No. 3,563,511, to Bentley-Leek, a flow characterizing insert, having a generally triangular shaped opening, similar to the opening shown in FIG. 1A, was utilized. In a later approach, which is still in use today, Worcester Controls offered a line of "Characterized Seat Valves," in which one of the seals of a ball valve included a wall defining an elongated opening in one of a variety of shapes, and combinations of shapes, including slots, holes and/or angled sides, as shown in FIGS. 1B–F, extending across the flowpath. More recently, others have proposed using elongated holes having side walls forming simple parabolic or other curved shapes, as shown in FIG. 1E, and exemplified by U.S. Pat. No. 5,937,890, to Marandi In even more recent prior approaches, as shown in FIGS. 1F–H, and exemplified by published U.S. patent application number US 2001/0030309 A1, to Carlson, et al; and U.S. Pat. No. 6,109,591, to Tuttle, et al; flow characterizing devices in the form of inserts or bearings included openings having side walls of complex curved shapes extending from a narrow apex, or pointed end, that was disposed adjacent the fully closed position of the controlling edge, when the flow characterizing device was installed adjacent the outer surface of a ball valve. In such arrangements, the opening is typically very narrow adjacent the apex, and then diverges rapidly in a smooth curve to provide a substantially wider open area adjacent an end of the opening opposite the apex.

The continual development, spanning several decades, in the shape and complexity of openings in flow characterizing devices is indicative of the practical difficulties involved both in designing and producing a characterizing device having an opening shape that will provide a desired valve characteristic, which may in some cases include at least portion thereof that approximates an equal percentage characteristic.

Designing such openings is made difficult by several factors, particularly where it is desired to have an equal percentage valve characteristic. In addition to the requirement that a valve characteristic provide an equal percentage characteristic over at least a desired range of controlled flows, it is generally a requirement that a ball valve provide a desired valve coefficient (CV) at a fully open position, and that the valve be capable of completely shutting off flow at the fully closed position of the valve member. In general, it is desirable that the valve be capable of supplying almost full flow at openings of 80% or greater, and provide for precise control of flow at valve openings between 0% and 80%, preferably according to an equal percentage characteristic for valves used to control flow in HVAC systems.

It is so difficult, in fact, to simultaneously meet all of these requirements in a single theoretical equal percentage characteristic curve, that designers typically utilize modified characteristic curves, having different incremental percentages for valve openings in the region from 80% to 100% of fully open, than are used in the range of 10% to 80% of fully open. Because a true equal percentage curve will never decrease totally to zero from any starting point at which the valve is open, designers must also typically modify the theoretical characteristic curve in some manner, for the range of valve openings below a low value, such as 10%, to cause the valve to close fully. Mathematical curves describing such modified equal percentage curves can be quite complex to develop, as exemplified in the US patent application referenced above, to Carlson et al, by a device "having a cross sectional area which approximates $e^a$ (h/100−1), where a is between about 2 and 5, and h is the valve shaft position, but modified so that the cross-sectional area is zero, when h is zero."

Even after such complex mathematical descriptions are developed by the designer, many practical difficulties exist which make it difficult to actually produce a flow characterizing device that will perform in accordance with the theoretical curve. Considerable difficulty is created by the very small, narrow, openings that are required adjacent the apex of the openings in prior characterizing devices. Complex manufacturing processes are typically required, such as cutting with a computer guided Laser or EDM (Electrical Discharge Machining), to accurately hold the tolerances on the dimensions of the complex shaped openings within tight enough limits to achieve the performance predicted by the theoretical characteristic curve developed by the designer. In some prior approaches, as exemplified by in the U.S. patent to Tuttle, et al, referenced above, it is suggested that the a valve seat be constructed of two halves which are lapped to fit closely together and secured together in a precise interfitting relationship, with corresponding portions of an aperture being formed in each half of the two halves.

Carlson, et al, teaches that, for very small flows, the opening tends to be very narrow adjacent the apex, creating a risk that dirt particles or other contamination may accumulate and interfere with operation of the valve. Carlson discloses disposing a cover or "tent" over the apex, leaving the flared ends uncovered, so that the cover prevents fluid from flowing directly from one side of the disk to the opposite side. Instead, the fluid has to flow sideways to find the portion of the opening that is not covered. The fluid has to flow a relatively long way before it passes the disk. Thus, according to Carlson, the cover enables the use of a larger opening near the apex while maintaining the desired flow characteristics. Carlson further asserts that the larger the opening adjacent the apex, the easier it will be for particles to pass, and that the cover maintains the desired flow characteristics while minimizing particle accumulation. Carlson does not, however, disclose a desired shape for the cover and the opening adjacent the apex, in order to provide flow control when the port in the ball is positioned to exchange fluid only with the covered portion of the opening, so that all flow passing through the disk must pass through the covered portion of the opening.

In addition to the problems involved in holding the tight tolerances that are required on the dimensions of the elongated opening, prior valves have also required a close conformance between the inner surface of the wall of the flow characterizing device and the outer surface of the valve member. As stated in the U.S. patent application to Carlson, et al, cited above, the "[s]urface of the disk that faces the ball advantageously is concave and substantially corresponds to the spherical surface of the ball or plug inside the valve. The disk is preferably mounted with its concave surface resting on or, more preferably, very close to the ball or plug. Preferably, a space between the disk and ball or plug is left so as to minimize fluid from flowing between the disk and the ball or plug (i.e., by-pass flow) yet so as to avoid interference of the disk with the ball or plug and to allow smooth operation of the valve. Most preferably, the space ranges from about 0.0005 to 0.0015 inches, and more preferably is about 0.001 inches." Fabricating and mounting flow characterizing devices meeting such tight requirements for conformance is a difficult manufacturing task.

What is needed, therefore, is an improved apparatus and method for providing a flow characterizing device for a fluid control valve, meeting the requirements and overcoming one or more of the problems described above in relation to the prior art. It is also desirable to provide such an improved apparatus and method in a form that results in reducing the torque required for repositioning the valve member in a ball valve. This is especially true for ball valves having an actuator motor connected to the valve member for repositioning the valve member, because lowering the torque requirement will allow a smaller actuator to be utilized. Generally speaking, smaller actuators can be produced at lower cost than larger actuators, and require less input power, thereby reducing both the initial cost and the operating cost of the actuator.

BRIEF SUMMARY OF THE INVENTION

The invention provides an improved apparatus and method for controlling fluid flow through a flowpath with a segmented characterizing channel and a controlling edge disposed adjacent the segmented characterizing channel, by placing the segmented characterizing channel and controlling edge into the flowpath and adjusting the relative positions of the segmented characterizing channel and the controlling edge with respect to one another. Either or both of the segmented flow characterizing channel and the controlling edge may be selectively movable, with respect to one another.

According to one aspect of the invention, fluid flow through a flowpath, defining a longitudinal axis of the flowpath, is controlled with a segmented characterizing channel and a controlling edge disposed adjacent the segmented characterizing channel, by placing the segmented characterizing channel and controlling edge into the flowpath and adjusting the relative positions of the segmented characterizing channel and the controlling edge with respect to one another. The segmented flow characterizing channel includes three or more discrete segments thereof, at least one of which is a through-hole. At least two or more of the three or more discrete segments are connected in fluid communication with the through-hole along a channel axis extending transversely to the longitudinal axis of the flowpath, with each of the at least two or more segments including a substantially axially facing wall thereof extending transversely to centerline of the flow controlling device, such that the flow area provided by each one of the at least two or more discrete segments, when the controlling edge is aligned therewith is a transversely facing flow area for controlling a flow of fluid through the flowpath. At least one of the controlling edge and the segmented flow characterizing channel is selectively movable along the channel axis.

Having the flow characterizing channel include three or more discrete segments significantly facilitates both the theoretical design of a desired flow characteristic curve, and the manufacture of a flow characterizing device configured for modifying fluid flow according the desired flow characterizing curve, by eliminating the need for reliance on complex equations needed for defining and manufacturing the characterizing openings of prior characterizing devices.

The invention provides an improved apparatus and method for modifying a valve characteristic, through use of a flow characterizing device having a segmented flow characterizing channel therein including three or more discrete segments, at least one of which is a through-hole, for modifying a flow of fluid through a flowpath, in which the flow characterizing device is mounted, when a controlling edge of a valve member, mounted in the flowpath adjacent the flow characterizing device, is aligned with one or more of the three or more discrete segments of the flow characterizing channel.

In one form of the invention, a flow characterizing device, adapted for placement in a flowpath adjacent to a movable valve member, but not including the valve member or the flowpath, is provided, for modifying fluid flow through the flowpath, where the flowpath defines a longitudinal axis thereof and the valve member includes an outer surface thereof having a controlling edge which is selectively movable, along a path extending transverse to the longitudinal axis, between a fully open and a fully closed position of the valve member in the flowpath. The flow characterizing device includes a body defining a longitudinal centerline of the flow characterizing device that extends substantially coincident with the longitudinal axis of the flowpath when the flow characterizing device is installed in the flowpath. The body also defines a transverse axis of the flow characterizing device that extends substantially coincident with the path of the controlling edge when the flow characterizing device is installed in the flowpath. The body further defines a datum surface of the flow characterizing device, that corresponds to the outer surface of the valve member when the flow characterizing device is installed in the flowpath, and inner and outer surfaces of the flow characterizing device which are disposed in a spaced relationship along the centerline of the flow characterizing device.

The inner surface of the flow characterizing device defines a land surface thereof conforming to a portion of the datum surface and contoured to bear against the outer surface of the valve member, for forming a substantially fluid-tight seal between the land surface and the outer surface of the valve member. The land surface may include one or more recessed areas therein, spaced a clearance distance from the datum, to thereby reduce frictional drag between the land surface and the valve member.

The inner surface of the flow characterizing device further defines a segmented flow characterizing channel therein, which is bounded at least partially by the land surface and the datum surface and includes three or more discrete segments thereof, at least one of which is a through-hole extending through the body for providing fluid communication between the inner and outer surfaces of the flow characterizing device. The other two of the three or more discrete segments of the flow characterizing channel are connected in fluid communication with the through-hole, with each discrete segment opening through the datum surface. When the controlling edge of the valve member is aligned with one of the discrete segments, that segment provides a uniquely sized, discrete, flow area at least partially bounded by the datum surface, for controlling a flow of fluid through the flowpath.

At least one of the other two or more discrete segments may include a wall thereof that extends transversely to centerline of the flow controlling device, such that the flow area provided by the at least one of the other two or more discrete segments, when the controlling edge is aligned therewith, is a transversely facing flow area for controlling a flow of fluid through the flowpath. Alternatively, the segmented flow control channel may include multiple segments having walls thereof extending transversely to centerline of the flow controlling device.

The segmented flow characterizing channel may be oriented to extend along the transverse axis of the flow characterizing device, with the through-hole being disposed substantially at one end of the channel, and the at least one segment having a wall thereof extending transversely to the centerline, being disposed at an opposite end of the channel. The segmented flow characterizing channel may include a first and a second segment thereof, with the first segment being disposed at the opposite end of the channel, with the segmented flow characterizing channel further including a flow characterizing surface, having adjacent first and second sections thereof that extend at least partially across the flowpath and have discrete leading and trailing edges that form a discontinuity at a juncture of the first and second segments of the flow characterizing channel, the discontinuities being configured for having the controlling edge selectively aligned therewith.

The first and second sections of the flow characterizing surface may be disposed at different distances from the datum surface. The first and second segments may form first and second transversely facing flow areas of different respective sizes, to thereby provide a stepped change in transversely facing flow area at the juncture between the first and second segments. The second transversely facing flow area may be larger than the first transversely facing flow area.

In some forms of the invention, the through-hole may include adjacent first and second discrete segments thereof, without a separating wall therebetween, and having discrete sidewalls discontinuously joined to one another at a juncture configured for having the controlling edge selectively aligned therewith at a predetermined location along the transverse axis. The first and second segments of the through-hole may form first and second axially facing flow areas of different respective sizes, to thereby provide a stepped change in axially facing flow area at the juncture between the first and second segments.

The discrete segments may be oriented in a series fluid circuit relationship to one another, and sized such that, when the controlling edge of the valve member is aligned with a given one of the segments, substantially all of a flow of fluid through the flowpath would pass through and be controlled by the uniquely sized, discrete, flow area provided by the given segment. Alternatively, two or more given segments of the three or more segments are oriented in a parallel fluid circuit arrangement to one another, such that when the controlling edge of the valve member is concurrently aligned with all of the given segments, substantially all of a flow of fluid through the flowpath would pass through and be controlled by the uniquely sized, discrete, flow areas provided by all of the given segments acting in a parallel fluid flow relationship. The given segments may also be oriented in a parallel-series fluid relationship to the through-hole in the flow characterizing channel, such that a summation of flows through the given segments passes through the through-hole.

In other forms of the invention, two or more given segments of the three or more segments may be oriented in a parallel fluid circuit arrangement to one another, such that when the controlling edge of the valve member is aligned with any one of the two or more given segments, substantially all of a flow of fluid through the flowpath would pass through and be controlled by the uniquely sized, discrete, flow areas provided by all of the given segments acting in a parallel fluid flow relationship.

Some forms of the invention may include a segment formed by spacing a portion of the land surface away from the surface of the valve member to thereby form a parallel path for directing fluid flow transverse to the surface of the valve member.

The flow characterizing device may also include a bearing surface for supporting the valve member within the flowpath. Alternatively, the flow characterizing device may be configured as an insert to be installed in the flowpath in conjunction with a bearing that supports the valve member.

Where the flow characterizing device includes a bearing surface, the bearing surface may include a groove therein, which may be configured for retaining a lubricant, such as grease, between the bearing surface and the outer surface of the valve member. The bearing surface may be formed by a portion of the land surface of the flow characterizing device.

By virtue of the configuration of the segmented flow characterizing channel of the invention, the effective area for fluid flow in the flowpath may be readily calculated at any given position of the controlling edge of the valve member, along the transverse path, as being substantially the arithmetic summation of one or more of the following:

(a) the transversely facing flow area bounded at least partially by a portion of a segmented surface when a portion of the controlling edge is aligned therewith with the controlling edge at the given position;

(b) the axially facing flow area bounded by a portion of the controlling edge of the outer surface of the valve member, at the given position, and a portion of the flow characterizing device that extends outward from a wall of the flowpath adjacent the controlling edge of the valve member when the controlling edge is near the fully closed position to the controlling edge when the controlling edge is at the given position;

(c) a transversely facing flow area at least partially bounded by a portion of the land surface spaced from the outer surface of the valve member when a portion of the controlling edge is aligned therewith at the given position.

By allowing for calculation of the effective flow area through a simple arithmetic summation of the transversely and axially facing flow areas provided by various forms of a flow characterizing device, according to the invention, it is not necessary to perform integration of complex curves defining the openings, in order to calculate the effective area for a given position of the valve member, as was the case with prior flow characterizing devices.

The invention is applicable to flow characterization in three-way ball valves, as well as in two way ball valves.

The invention may also take the form of a ball valve incorporating a flow characterizing device, according to the invention, or a method for designing and/or manufacturing a flow characterizing device or a valve, according to the invention. The invention may also take the form of a method for modifying a flow of fluid in a flowpath.

Other aspects, objectives and advantages of the invention will be apparent from the following detailed description and the accompanying drawings.

BRIEF DESCRIPTION OF THE DRAWINGS

FIGS. 6A–6E are perspective and cross sectional illustrations of a third exemplary embodiment of a flow characterizing device, according to the invention, providing a maximum flow rating of 7.4 Cv, and a graph showing performance of a valve incorporating the third exemplary embodiment of the flow characterizing device.

FIGS. 7A–7D are perspective and cross sectional illustrations of a full flow bearing, according to the invention.

FIGS. 8A–8C are schematic cross-sectional top views through the ball valve of FIGS. 1 and 2, with the valve member rotated to the fully open, fully closed, and an intermediate angular position.

FIGS. 8D–8F are schematic cross-sectional end views, taken along respective lines as indicated in FIGS. 8A–8C showing the flow area through the flowpath which would be provided at each of the corresponding illustrated in FIGS. 8A–8C, without the flow characterizing device of the invention, and illustrating a controlling edge of the valve member.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1D:
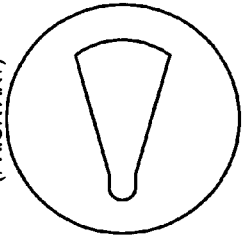
FIGS. 1A–1L are schematic illustrations of prior art flow characterizing inserts and bearings.
Figure 1C:
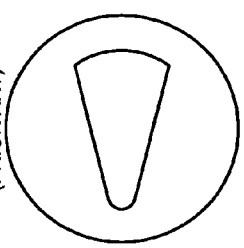
Figure 1B:
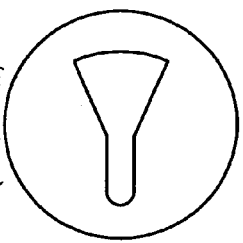
Figure 1A:
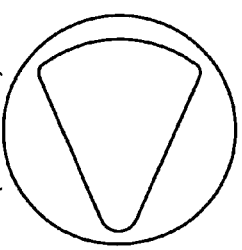
Figure 1H:
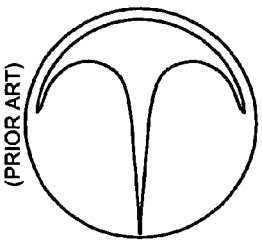
Figure 1G:
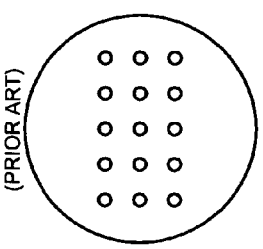
Figure 1F:
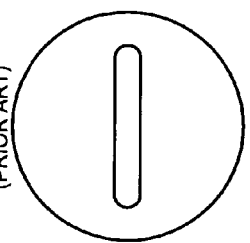
Figure 1E:
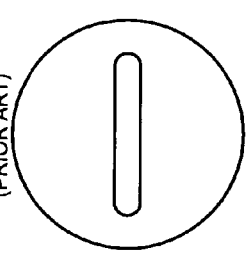
Figure 1L:
Figure 1K:
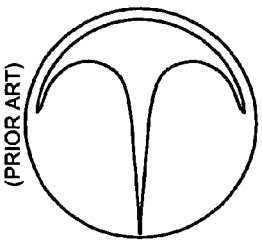
Figure 1J:
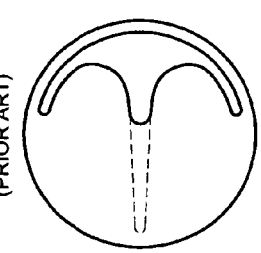
Figure 1I:
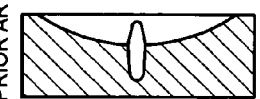
Figure 2:
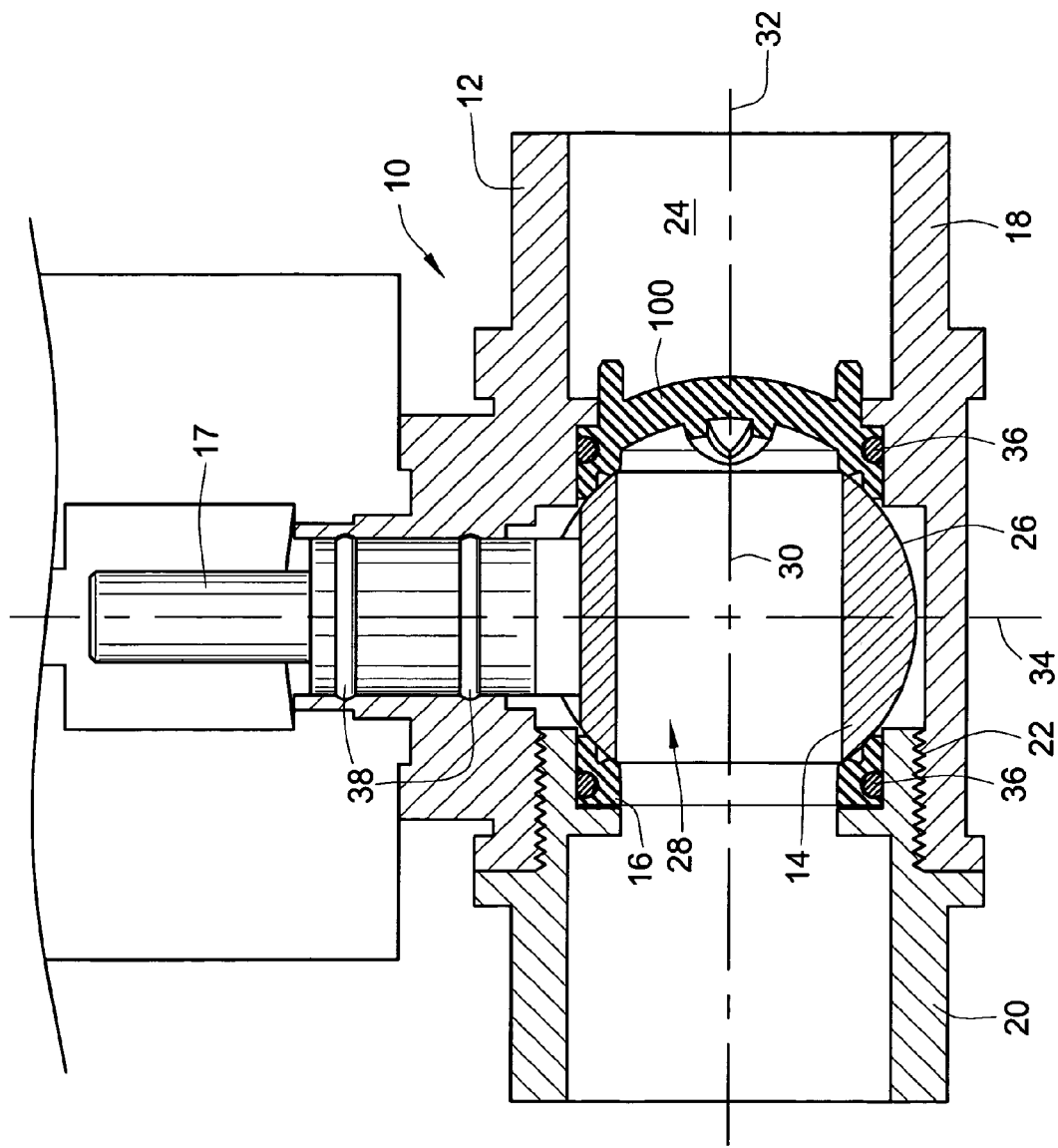
FIG. 2 is a cross-sectional side view of a first exemplary embodiment of the invention, in the form of a ball valve having a flow characterizing bearing according to the invention, showing a valve member of the ball valve in a fully open position.
Figure 3:
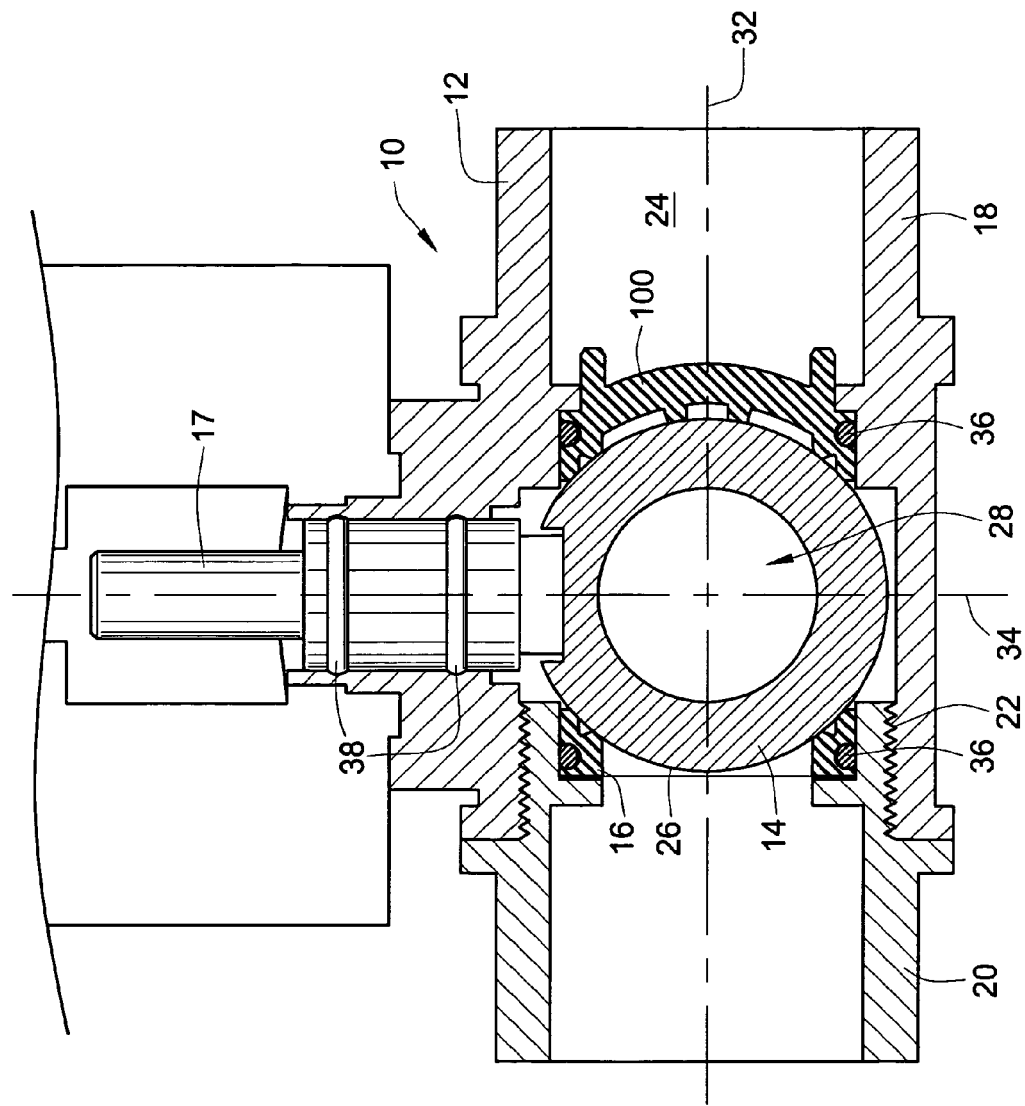
FIG. 3 is a cross-sectional side view of the same ball valve shown in FIG. 2, with the valve member of the ball valve in a fully closed position.

FIGS. 2 and 3 show a first exemplary embodiment of the invention, in the form of a ball valve 10, according to the invention. The ball valve 10 includes a valve housing 12, a valve stem 17 having a distal end thereof extending through the housing 12, and a valve member 14 mounted between a full flow bearing 16 and a first embodiment of a flow characterizing device, in the form of a flow characterizing bearing 100.

Although FIG. 2 shows a first embodiment of the flow characterizing bearing 100, as shown in more detail in FIGS. 4A–4P, second and third embodiments of flow characterizing bearings 200, 300, as shown in FIGS. 5A–5F and 6A–6E, are also described below, to illustrate various aspects of the invention. It is understood that any of the first, second, or third embodiments of the flow characterizing bearing 100, 200, 300, can be used in the exemplary embodiment of the ball valve 10. It is further understood, that the three exemplary embodiments of the characterizing bearing 100, 200, 300 were selected for illustrative purposes. In practicing the invention, a characterizing bearing, according to the invention, may take many other forms, within the scope of the appended claims, with the selection of a particular flow characterizing bearing configuration being made in consideration of a desired valve characteristic.

The valve housing 12 includes a first section 18 and a second section 20 which are joined by a threaded attachment 22, to define a flow path 24 extending through the housing 12.

As shown in FIGS. 2 and 3, the valve member 14 of the exemplary embodiment of the ball valve 10 is mounted between the characterizing bearing 100 and the full flow bearing 16, and operatively connected to the valve stem 17 for selective rotation about an axis of rotation 34. The valve member 14 of the exemplary embodiment is a generally spherically shaped ball having a substantially spherical outer surface 26. A through bore 28 extends through the valve member 14 to provide a fully open position of the ball valve 10 when the valve member 14 is rotated to the position illustrated in FIG. 2, with a center line 30 of the bore 28 substantially aligned with a longitudinal center line 32 of the flow path 24.

The flow characterizing bearing 100 and the full flow bearing 16 are disposed in the flow path 24 between the valve member 14 and the valve housing 12, and are sealingly attached to the valve housing 12 by a pair of O-ring seals 36. The valve stem 17 is rotatably sealed to the valve housing 12 by a second pair of O-rings seals 38, with the inner end of the stem 17 being operatively connected to the valve member 14, and a distal end of the valve stem 17 being exposed outside of the valve housing 12, for connection to an actuator or a handle, etc., so that the valve member 14 can be rotated to a desired angular position about the axis of rotation 34.

Figure 7D:
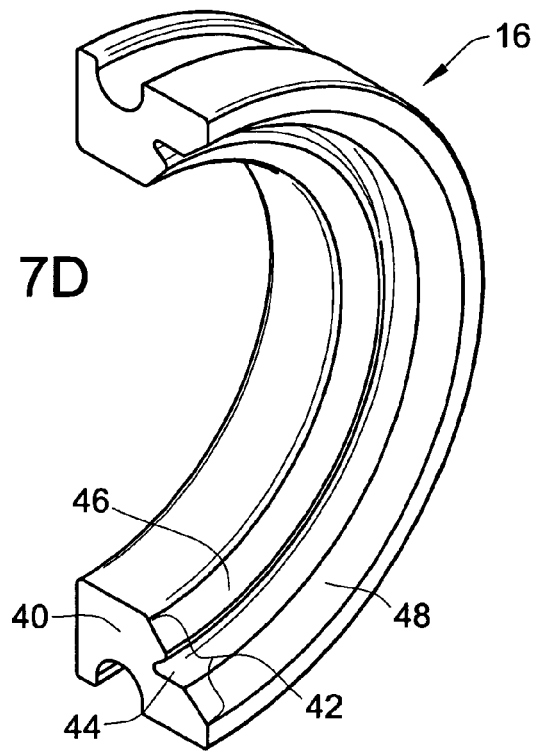

As shown in FIGS. 7A–D, and particularly in FIG. 7C, the full flow bearing 16 includes a generally annular shaped body 40, defining a bearing surface 42 adapted for bearing against the outer surface 26 of the valve member 14, when the valve member 14 and full flow bearing 16 are installed in the flowpath 24. The bearing surface 42 includes a groove 44 therein, dividing the bearing surface 42 into a first and a second bearing surface 46, 48, both of which bear against the outer surface 26 of the valve member 14, when the valve member 14 and full flow bearing 40 are installed in the valve housing 12. The first and second bearing surfaces 46, 48 provide a substantially fluid-tight seal against the outer surface 26 of the valve member 14, with the groove 44 preferably being adapted for holding a lubricant, such as a silicone grease, for reducing friction between the outer surface 26 of the valve member 14 and the first and second bearing surfaces 46, 48 of the full flow bearing 16. The body 40 of the full flow bearing 16 also includes a pair of diametrically opposed mounting tabs 54, configured for attachment by means such as staking or adhesive bonding, to the valve housing 12.

The body 40 of the full flow bearing 16 further defines an inner diameter 50 of the full flow bearing 16, which has a dimension smaller than the diameter 52 of the through-bore 28 in the valve member 14, as indicated in FIG. 7C. By virtue of this arrangement, the area defined by the inner diameter 50 of the full flow bearing 16 would constitute a minimum effective area of the flowpath 24, when the valve member 14 is in the fully open position shown in FIG. 2, were it not for the presence of a flow characterizing bearing 100, 200, 300, according to the invention, as described below.

Figure 8F:
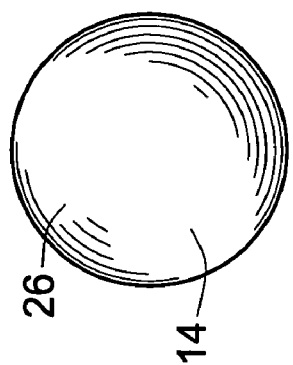
Figure 8C:
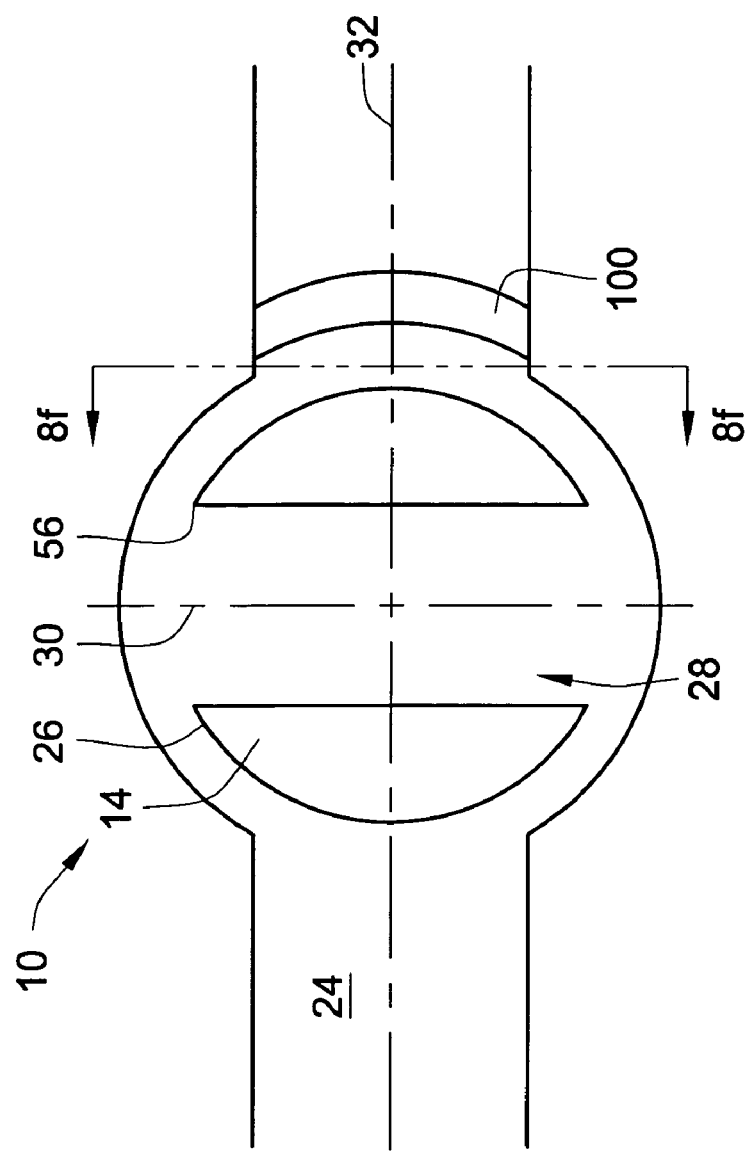

As illustrated in FIGS. 8A–8F, as the valve member 14 is rotated from the fully open position, as shown in FIG. 8A to the fully closed position, as shown in FIG. 8C, the corner 56 formed by of the edge of the through-bore 28 in the valve member 14 with the outer surface 26 of the valve member 14 forms a controlling edge 56 of the outer surface 26, which moves along a path 58 (shown in FIGS. 8B and 8E) extending transverse to the longitudinal axis 32 of the flowpath 24. As the controlling edge 56 moves along the transverse path 58, the open area through the flowpath 24 will be determined by the angular position of the controlling edge 56 along the transverse path 58. As will be understood from the explanation below, the intersection of the controlling edge 56 with discrete features of a segmented flow characterizing bearing 100, 200, 300, according to the invention, is utilized for modifying flow through the flowpath 24 to provide a desired valve characteristic.

FIGS. 4A–4D are enlarged views of the first embodiment of a flow characterizing device 100, according to the invention. Specifically, FIGS. 4A–4D illustrate a flow characterizing device in the form of a flow characterizing bearing 100, according to the invention, for use in a ball valve having a flow path of about ½ to ¾ inches in diameter and providing a flow coefficient value of 0.74 Cv, where the flow coefficient is defined by the equation $Cv=Q/\sqrt{\Delta P}$, with $\Delta P$=pressure drop (eg. Pounds per square inch) and Q=volumetric flow (eg. Gallons per minute) at the fully open position.

The first embodiment of the flow characterizing bearing, according to the invention, includes a body 102 defining a longitudinal center line 104 of the flow characterizing device 100 that extends substantially coincident with the longitudinal axis 32 of the flow path 24 when the flow characterizing device 100 is installed in the flow path 24, and a transverse axis 106 of the flow characterizing device 100 that extends substantially coincident with the path 58 of the controlling edge 56, of the valve member 14, when the flow characterizing bearing 100 is installed in the flow path 24. The body 102 of the flow characterizing bearing 100 also defines a datum surface 108 of the flow characterizing bearing 100, which corresponds to the outer surface 26 of the valve member 14, when the flow characterizing bearing is installed in the flow path 24. The body 102 of the flow characterizing bearing 100 further defines inner and outer surfaces 110, 112 of the flow characterizing bearing 100, disposed in a spaced relationship to one another along the longitudinal center line 104 of the flow characterizing bearing 100.

The inner surface 110 of the flow characterizing bearing 100 defines a land surface 114 thereof, conforming to a portion of the datum surface 108, and contoured to bear against the outer surface 26 of the valve member 14, for forming a substantially fluid-tight seal between the land surface 114 and the outer surface 26 of the valve member 14.

Figure 4C:
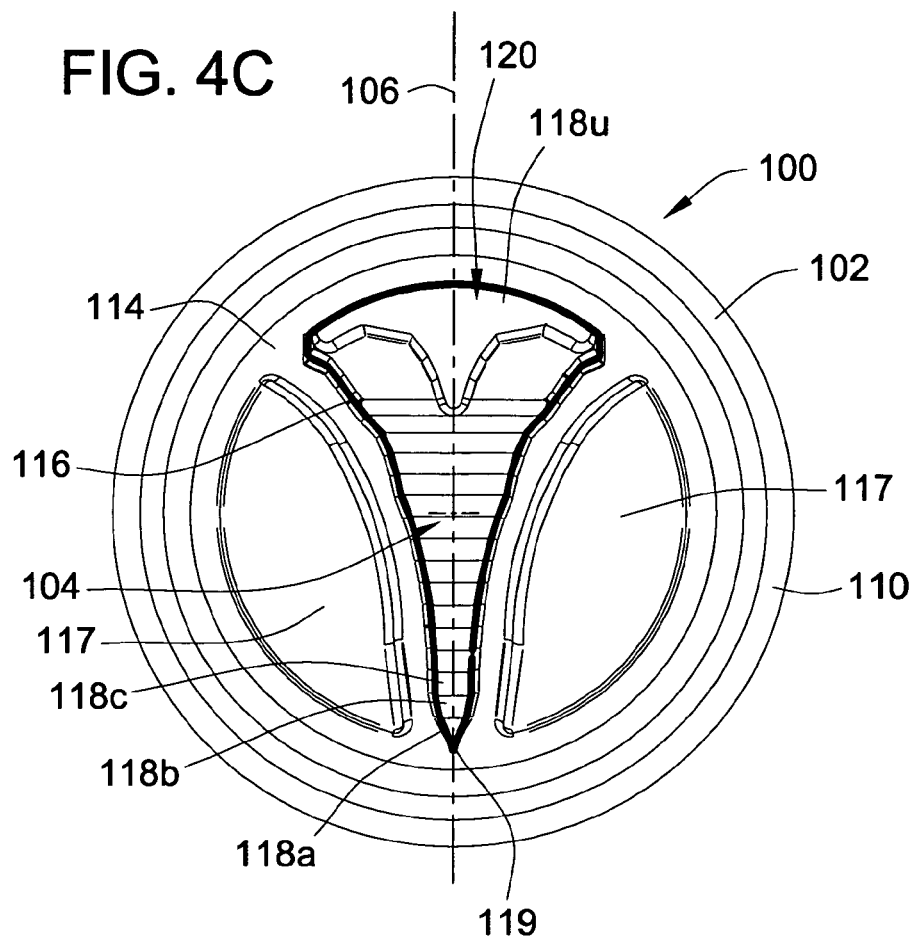
FIGS. 4A–4P are perspective and cross sectional illustrations of a first exemplary embodiment of a flow characterizing device, according to the invention, providing a maximum flow rating of 0.74 Cv, and a graph showing performance of a valve incorporating the first exemplary embodiment of the flow characterizing device.
Figure 4D:
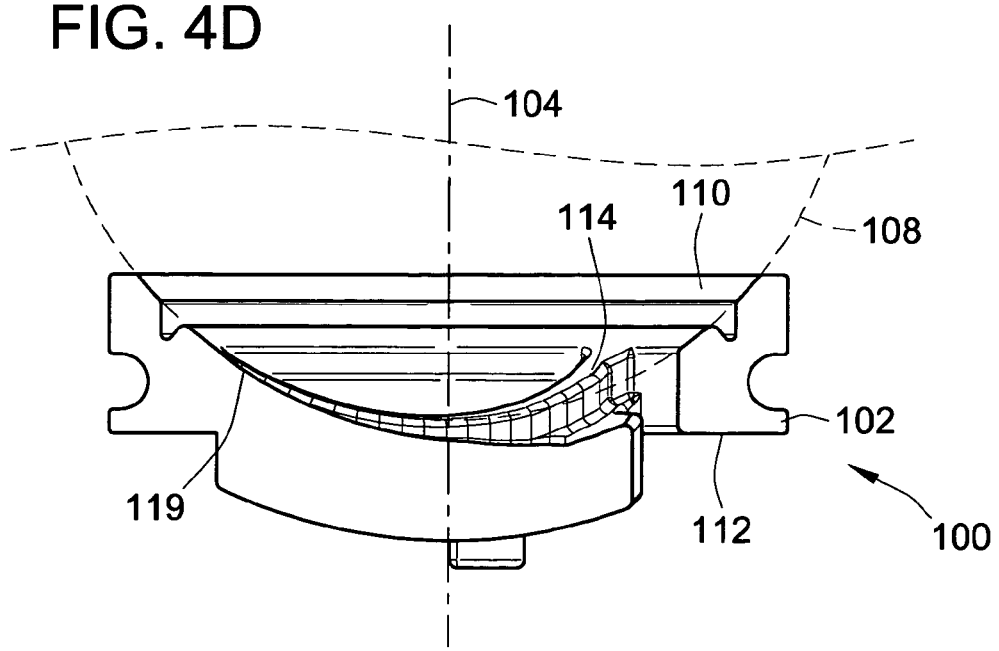

The inner surface 110 of the flow characterizing device 100 also defines a segmented flow characterizing channel 116 therein, illustrated by a dark outline in FIG. 4C, and a pair of recesses 117 which are not connected in fluid communication with the flow characterizing channel when the outer surface 26 of the valve member 14 is bearing against the land surface 114. The recessed areas 117 are provided to reduce the contact area between the outer surface 26 of the valve member 14 and the land surface 114 of the flow characterizing bearing 100, in order to reduce friction and torque required for positioning the vavle member 14 with respect to the characterizing bearing 100.

Figure 4O:
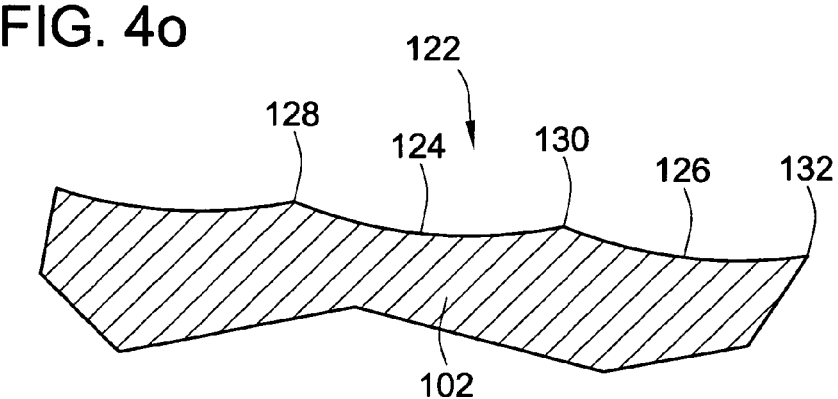
Figure 4E:
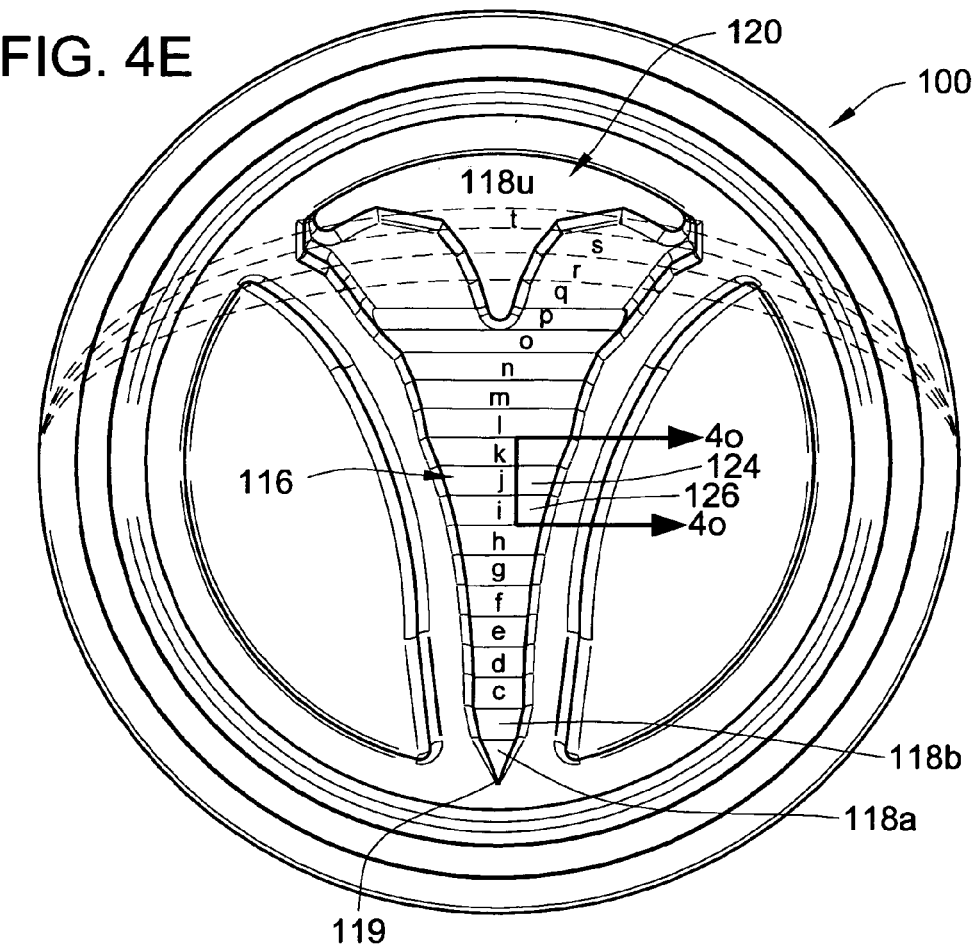

The segmented flow characterizing channel 116 of the flow characterizing bearing 100 is bounded at least partially by the land surface 114 and the datum surface 108. As shown in FIG. 4E the segmented flow characterizing channel 116, of the first exemplary embodiment of the characterizing bearing 100 includes a plurality of discrete segments 118A–118U, extending along the transverses axis 106, and with each of the discrete segments 118A–118U opening through the datum surface 108 of the flow characterizing bearing 100. As will be seen from FIGS. 4A–4O, segment 118A forms an apex 119 of the flow characterizing channel 116, with each adjacent segment, when moving away from the apex 119, defining a slightly larger flow area with respect to the datum surface 108 of the flow characterizing bearing 100 than the preceding segment, in a manner described in more detail below, with reference to FIGS. 4F through 4O.

Segments 118P–118U include portions thereof forming a through-hole 120 extending through the body 102 to provide fluid communication between the inner and outer surfaces 110, 112 of the flow characterizing bearing 100. When the ball valve 10 is configured as a flow control valve, the apex 119 of the flow characterizing channel 116 is disposed along the transverse path 58 of the controlling surface 56 at a point closest to an initial opening position of the valve 10, and the through hole 120 is disposed along the transverse path 58 of the controlling surface 56 at a point closest to the fully open position of the valve 10. Conversely, when the ball valve 10 is configured as a quarter-turn on-off valve, the apex 119 of the flow characterizing channel 116 is disposed along the transverse path 58 of the controlling surface 56 at a point closest to the fully open position of the valve 10, and the through hole 120 is disposed along the transverse path 58 of the controlling surface 56 at a point closest to the initial opening position of the valve 10.

It will be noted that, as shown in FIG. 4B, the body 102 of the characterizing bearing 100 includes a pair of diametrically oppositely disposed mounting tabs 121, 123, extending from the outer surface 112 of the body 102, for attachment of the characterizing bearing 100 to the valve housing 12, in the same manner as described above in relation to the mounting tabs 54 of the full flow bearing 16. The mounting tabs 121, 123 of the flow characterizing bearing 100 preferably have configurations, such as those shown in FIG. 4B, which are different from one another, to facilitate orientation of the flow characterizing bearing 100 during assembly into the valve housing 12 for configuring the valve 10 as either a flow control valve or an on-off valve.

As shown in FIGS. 4A–4E, segments 118A–118T of the segmented flow characterizing channel 116 include portions thereof having substantially axially facing, transversely extending wall sections that collectively form a segmented substantially axially facing flow characterizing surface 122 that extends transversely along the longitudinal centerline 104, from the apex 119 of the flow characterizing channel 116 to the through hole 120. As shown greatly enlarged in FIG. 40, adjacent sections 124, 126 the flow characterizing surface 122 have discrete leading and trailing edges 128, 130, 132 thereof that form a discontinuity at the common juncture 130 formed by the trailing edge of the first section 124 and the leading edge of the second section 126.

As stated above, in the first embodiment of the flow characterizing bearing 100, each adjacent segment, starting from the apex 119, defines a slightly larger flow area with respect to the datum surface 108 of the flow characterizing bearing 100. This can be accomplished in portions of the segments 118A–118T having transversely extending walls forming sections of the segmented flow characterizing surface 122 by either or both of two ways. For any two given adjacent segments of the segments 118A–118T forming the flow characterizing surface, where the second section 126 is the section that is disposed farther from the apex 119 than the first section 124, the transversely extending wall forming the second section 126 of the flow characterizing surface 122 can be disposed at a greater distance from the datum surface 108 than the fist section 124 of the flow characterizing surface 122, such that a second transversely facing flow area created when the controlling edge 56 of the valve member 14 is aligned with the trailing edge 132 of second section 126 is larger than a first transversely facing flow area created when the controlling edge 56 of the valve member 14 is aligned when the valve member is aligned trailing edge 132 of second section 126. Alternatively, or in addition to disposing the second section 126 at a greater distance from the datum surface 108 than the first section 124, the width of the channel 116 in the segment forming the second section 126 may be greater than the width of the segment forming the first section 124 of the flow characterizing channel 116.

As will be understood from an examination of FIGS. 4A–4k, in the segmented flow characterizing channel 116 of the first exemplary embodiment of a flow characterizing bearing 100, according to the invention, both the width and the distance from the datum surface increase in discrete increments, along the flow characterizing channel 116, moving in a direction from the apex 119 toward the through hole 120. As shown in FIGS. 4F–4I, when the controlling edge 56 is in a first angular position, indicated as position 'A' in FIGS. 4F and 4G, in substantial alignment with some portion of the segment 118A forming the apex 119, and specifically as shown in alignment with the trailing edge of the first segment 118A, the controlling edge 56 in conjunction with the first segment 118A will define a first transversely facing flow area 134 of the segmented flow characterizing channel 116 having a small cross sectional area with a width $w_1$, and a height $h_1$ as measured from the datum surface 108 and the outer surface 56 of the valve member 14.

Figure 4F:
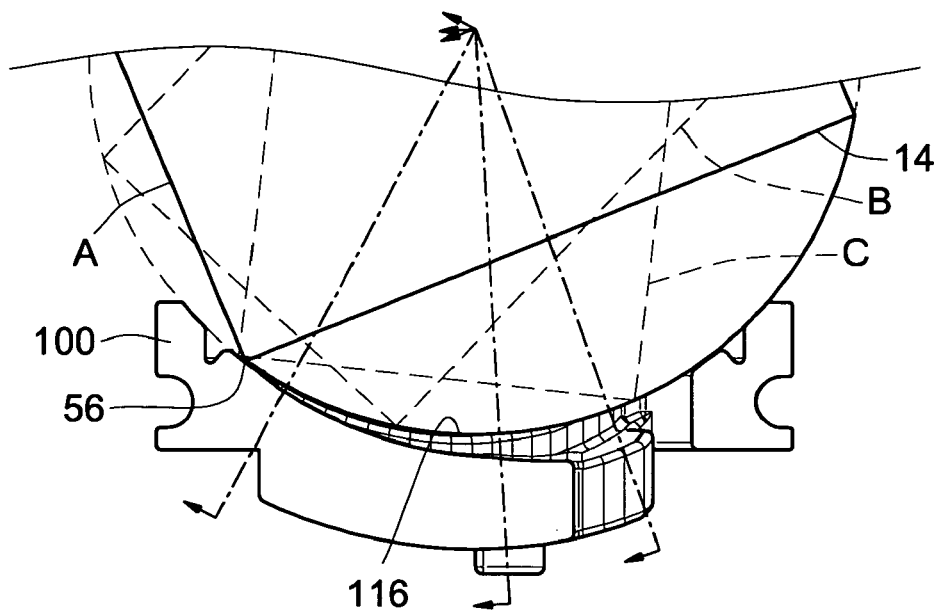
Figure 4G:
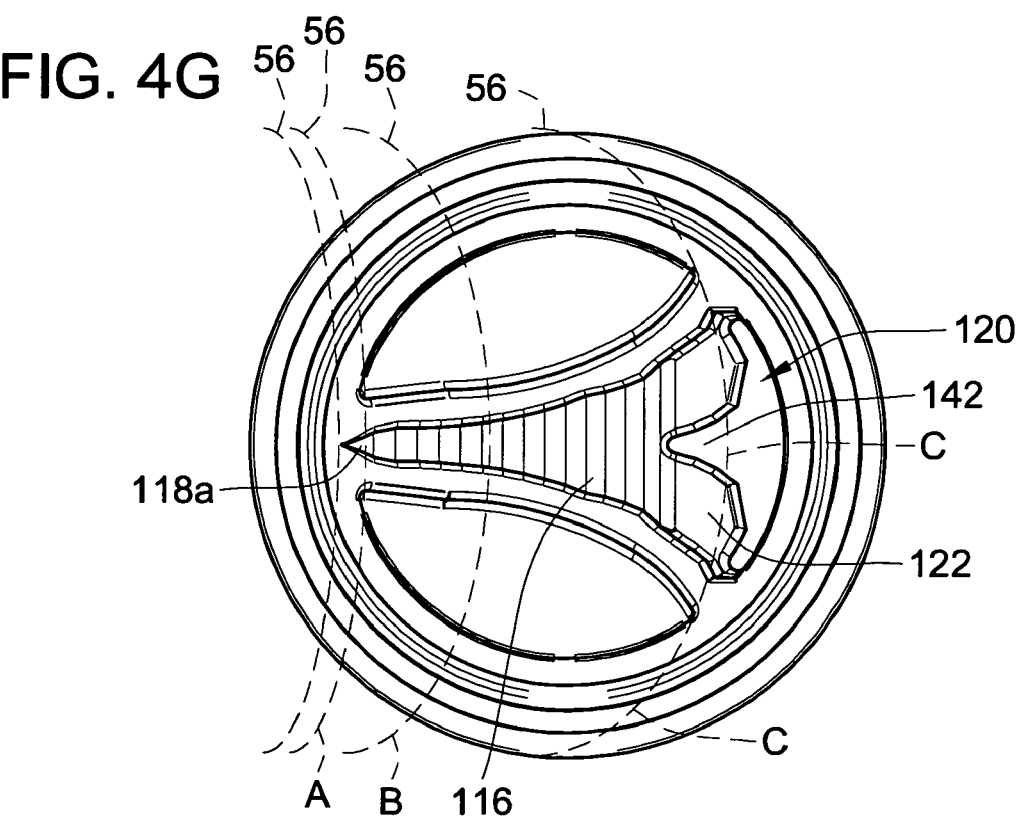
Figure 4L:
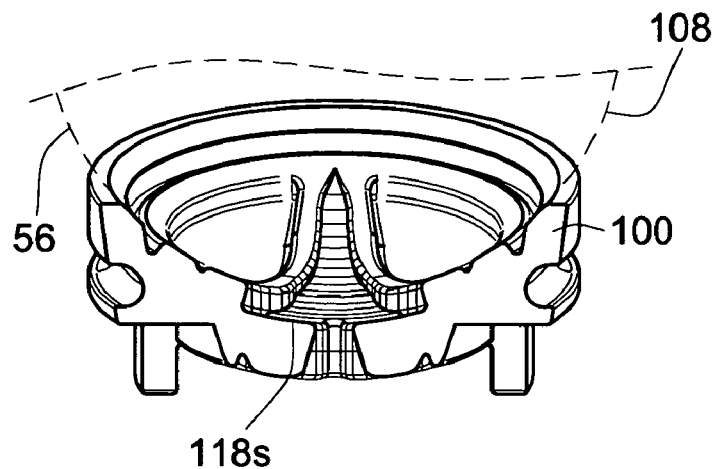

As shown in FIGS. 4F, 4G, 4J and 4K, when the when the controlling edge 56 is in a second angular position, indicated as position 'B' in FIGS. 4F and 4G, in substantial alignment with some portion of the segment 118G of the flow channel 116, and specifically as shown in alignment with the trailing edge of segment 118G, the controlling edge 56 in conjunction with segment 118G will define a second transversely facing flow area 136 of the segmented flow characterizing channel 116, with the second transversely facing flow area 136 having a larger cross sectional area with a greater width $w_2$, and a greater height $h_2$ than the first transversely facing flow area 134.

It will be understood, from the foregoing explanation, that all fluid flowing through the valve 10 through either of the first of second transversely facing flow areas 134, 136, must flow in a transverse direction through the segmented flow characterizing channel 116, between a portion of the outer surface 56 of the valve member 14 and the flow characterizing surface 122, in order to flow in either direction through the flowpath 24 of the valve 10. It will be further understood that the segmented configuration of the flow characterizing channel 116 considerably facilitates the design and production of the flow characterizing bearing 100.

As shown in FIGS. 4F, 4G, and 4L through 4N, when the when the controlling edge 56 is in a third angular position, indicated as position 'C' in FIGS. 4F and 4G, in substantial alignment with some portion of the segment 118S of the flow channel 116, and specifically as shown in alignment with the trailing edge of segment 118S, the controlling edge 56, in conjunction with segment 118S, defines a compound flow controlling area having both transversely facing and axially facing flow areas, and a total effective flow area that is larger than either of the first or second transversely facing flow areas 134, 136.

Specifically the compound flow controlling area at segment 118S includes a pair of third transversely facing flow areas 138, 140, which are divided from one another by an axially opening flow area 142, as shown in FIGS. 4G, 4L, 4M, and 4N.

Figure 4M:
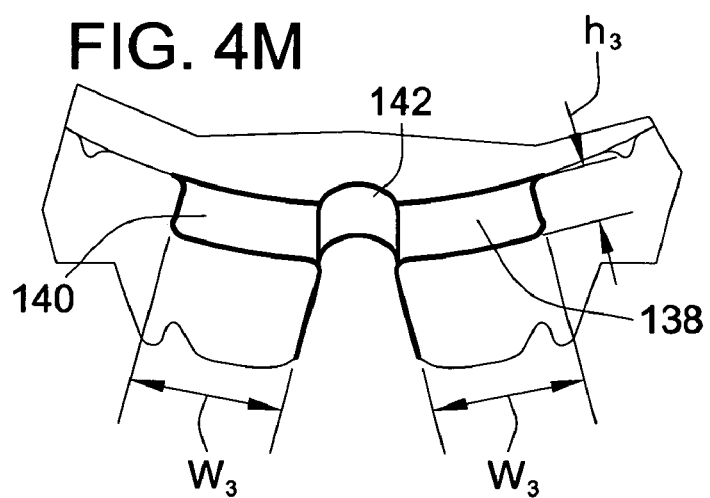
Figure 4N:
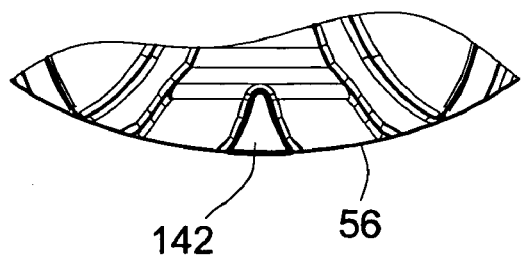

As was the case with the first and second transversely facing flow areas 134, 136, the effective area of the third transversely facing flow areas can be readily calculated as the sum of the products of the width $w_3$, and the height $h_3$ of the third transversely facing flow areas 138, 140, as shown in FIG. 4M. The size of the axially facing flow area 142 is found by a summation of the axially facing areas formed by the axially opening portions of the segments, 118P–118T, when the controlling edge is disposed at angular position 'C,' as illustrated in FIGS. 4N, 4E, and 4G. The areas of the individual axially facing areas of the portions of the segments 118P–118T are readily calculated by simple calculations, involving primarily 2-dimensional plane geometry.

From the forgoing description, it will be understood that, because the segments 118A–118U of the first exemplary embodiment of the flow characterizing bearing 100 are configured in substantially a series fluid circuit relationship to one another, all of the transversely facing flow areas, or the compound flow controlling areas, defined by the alignment of the controlling edge 56 with a given one of the segments 118A–1118U, will create an effective orifice area for controlling flow, or in other words, a "pinch point" in the segmented flow characterizing channel 116, having a smaller effective flow area than the flow areas on either side of the segment aligned with the controlling edge. As a result, through practice of the invention, it is not necessary to integrate complex equations to determine a desired or actual flow area at a given angular position of the controlling edge, in the manner that was required when designing prior flow characterizing devices.

In accordance with the invention, it is a relatively straightforward, iterative process, to design and produce a flow characterizing device providing a desired valve characteristic curve.

For example, in order to design and build a characterizing bearing 100, as described above, to provide an equal percentage valve characteristic over a desired control range of 10 percent to 80 percent of valve opening, with a valve coefficient of 0.74 Cv at the 100 percent open position, in a ½ inch ball valve, the following method is preferably utilized, in accordance with the invention.

Initially, it is assumed that the flow from zero percent to 10 percent of the valve opening should approximate a linear relationship, rather than an equal percentage, to maximize valve rangeability. It is also assumed that the valve should supply as much flow as possible at 80 percent of valve opening, in the same manner as globe valves, and that between 10 percent and 80 percent of the valve opening, the valve characteristic should provide a constant and relatively small, true equal percentage number of about 0.6.

An initial selection is then made of a desired number of segments to be used in developing the curve and producing the segmentized channel in the flow characterizing device. The initial selection of the number of segments will in most cases be refined after the curve is roughly defined. It is desirable to have a large enough number of segments in the final curve to provide good control rangeability, but too many segments actually diminish controllability and make design and fabrication more difficult. In the example below, ten segments are initially selected, and the following tabulation is developed:

The following equation is used for refining the rough values in Table 1, for those segments where it is desired to maintain an equal percentage flow characteristic, in accordance with the decisions laid out in the paragraphs above regarding refinement of the rough curve.

$$K_R = (K_B)^{(1/n)}$$

Where:

n=the number of new segments needed for refining a given one of the initially selected segments, with n being always equal to at least two;

$K_B$=equal percentage number from Table 1 for the given segment; and $K_R$=new equal percentage number for new segments in the refined given segment.

For the initially selected segment from zero to 10 percent of opening, however, a linear division is utilized, because it has been shown that if an attempt is made to provide an equal percentage characteristic in this range, valve performance will be degraded.

TABLE 1

| % open | 100 | 90 | 80 | 70 | 60 | 50 | 40 | 30 | 20 | 10 | 0 |
|---|---|---|---|---|---|---|---|---|---|---|---|
| Rotational angle (deg) | 90 | 82.3 | 74.6 | 66.9 | 59.2 | 51.5 | 43.8 | 36.1 | 28.4 | 20.7 | 13 |
| Equal percentage number Flow % | | .85 | .75 | .59 | .59 | .59 | .59 | .59 | .59 | .59 | N/A |
| Cv value | .74 | .629 | .4718 | .2783 | .1642 | .969 | .0572 | .0337 | .0199 | .0117 | 0 |

It should be noted that the values in Table 1 take into account the fact that a ball valve having a spherical ball typically does not begin to open until about 13 degrees of rotation. This characteristic is caused by the fact that the bore in the valve member must typically be rotated approximately 13 degrees past the point of initial closure in order to ensure that the bore is sufficiently engaged with the seal/bearing of the valve to preclude leakage through the valve.

The rough curve laid out in Table 1 is then refined to more finely divide the some of the initially selected increments. Because it is desired to have the valve be essentially fully open above 80 percent of the valve opening, the first and second segments, corresponding to 100 percent and 90 percent open, will not be further refined. This is considered to be acceptable because the 80 to 100 percent range is beyond the desired control range of 10 to 80 percent of full opening, and therefore, having an equal percentage characteristic above 80 percent open is not required.

The next three segments, corresponding to 60 to 80 percent open, should each be divided into 2 to 4 additional segments each, because, the valve is not normally used for regulating flow in this range of percentage of opening. The next four segments of the originally selected ten, corresponding to 10 to 50 percent opening should be further subdivided into as many segments as a practically achievable, for a given desired Cv and valve size, because this range is where the valve will be called upon to modulate flow most of the time. The last of the originally selected ten segments, from zero to 10 percent of full opening, need not be further divided for flow control reasons, because of the initial assumption that this region will provide a linear flow characteristic. This area will be divided into 2 to 3 segments, however, to provide an improved contour shape of the flow characterizing channel near the apex of the channel.

Refining the initial curve in the manner described above, provides the valve characteristic shown in solid lines in FIG. 4P, having 20 segments, from 13 to 90 degrees of rotation, corresponding to the segments 118A–118U of the first exemplary embodiment of the flow characterizing bearing 100 described above. The significance of the dashed line in FIG. 4P will be described below.

Once the Cv values for each segment are refined, the contour of each segment is determined, and a three dimensional drawing of the characterizing bearing 100 is developed, using standard geometric and mathematical calculations, utilizing parameters such as the actual diameter of the through-bore 28 in the valve member 14, and the contour of the outer surface 26 of the valve member 14 as a basis for the calculations. The flow characterizing device is then fabricated by processes such as machining or molding.

The degree of precision that must be exercised in performing these calculations and in fabricating the flow characterizing device depends upon such factors as the physical size of the valve member, the accuracy of the flow control desired, and practical factors such as the tolerances that can be held during manufacture of the characterizing device. The illustrations in the drawings of the exemplary embodiments of the ½ inch nominal diameter valve described herein are greatly enlarged. It will be appreciated that, in manufacturing such small parts, holding precise dimensional relationships between the salient features is of considerable importance. Those having skill in the art will recognize that the segmented channel construction of a flow characterizing device, according to the invention is readily amenable to manufacture by molding as one piece, to thereby allow considerable accuracy and precise control of tolerances.

For greatest accuracy in a ball valve having a spherical outer ball surface, as in the exemplary embodiments disclosed herein, it is preferred that transversely extending surface of any given flow characterizing channel be configured to have a double curved surface having a radius that is substantially the arithmetic sum of the spherical radius of the outside of the ball and the height 'h' of the transversely facing flow area defined by the given segment when the controlling edge of the valve member is aligned therewith. It is also preferred that the intersections of the segments be curved and somewhat elliptically shaped to closely follow the curve of the controlling edge when the ball is rotated to an angular position aligning the controlling edge with the leading or trailing edge of that segment. It is further preferred that, in the final configuration of the valve, the flow areas defined at each section include any corner radii or draft angles, etc., that are defined by either or both of the flow characterizing channel and the valve member.

In most embodiments of the invention, however, it is not contemplated that such extreme measures would need to be taken, in order to provide a desired valve characteristic. It will typically be acceptable to utilize flat surfaces, rather than precisely double curved surfaces, and to ignore some of the corner radii and draft angles in achieving a desired valve characteristic. The segmented construction of a flow characterizing channel, according to the invention, also greatly facilitates any adjustment that needs to be done to the shape of the segments in order to achieve a desired valve characteristic. Because each segment is essentially a "pinch point" for flow through the valve, when the controlling edge is aligned therewith, the dimensions of each segment can be altered relatively independent of the other segments, in fine-tuning the shape of the segmented flow control channel. Where the flow control device is molded in one piece, the tooling can be readily fine-tuned, and thereafter consistently accurate parts can be formed.

FIGS. 5A–5D show a second exemplary embodiment of a flow characterizing device 200, according to the invention, for providing a maximum flow rating of 4.7 Cv in the ball valve of FIGS. 1 and 2. In general, the second flow characterizing device 200 is constructed in the same manner as the first flow characterizing bearing 100, as described above in relation to FIGS. 4A–4P, with one major difference.

Figure 5B:
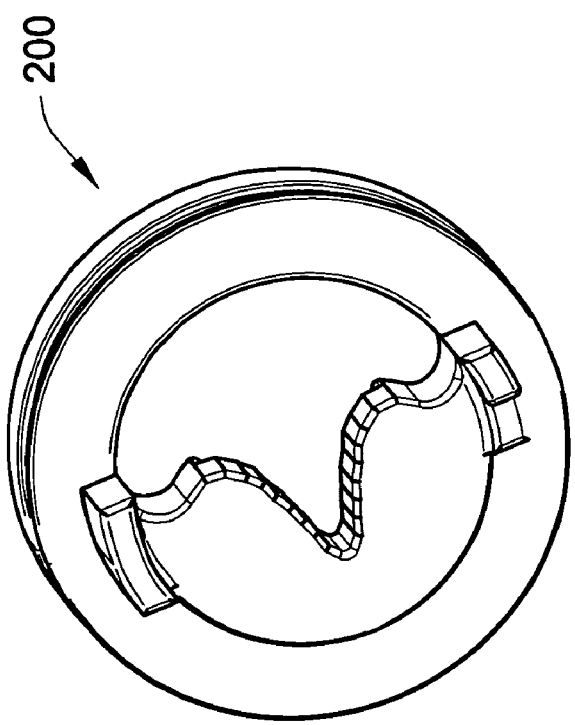
FIGS. 5A–5F are perspective and cross sectional illustrations of a second exemplary embodiment of a flow characterizing device, according to the invention, providing a maximum flow rating of 4.7 Cv, and a graph showing performance of a valve incorporating the second exemplary embodiment of the flow characterizing device.
Figure 5A:
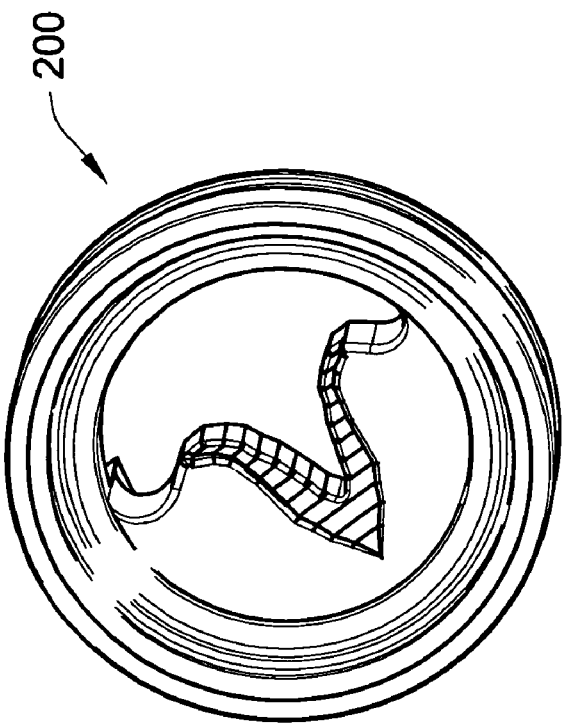
Figure 5C:
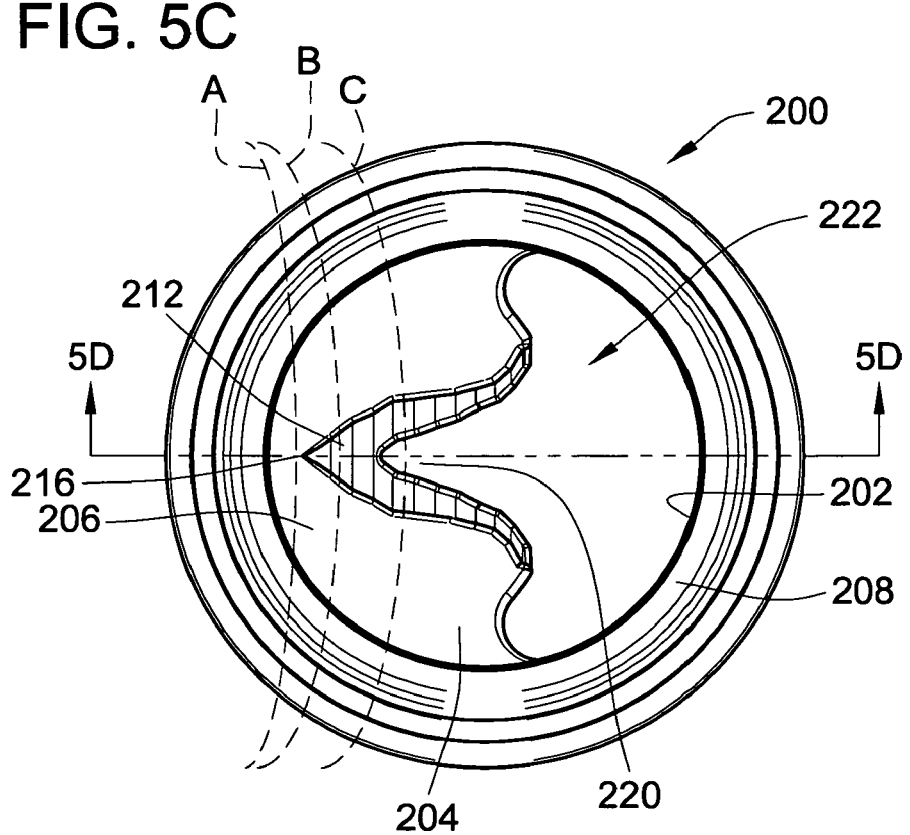
Figure 5D:
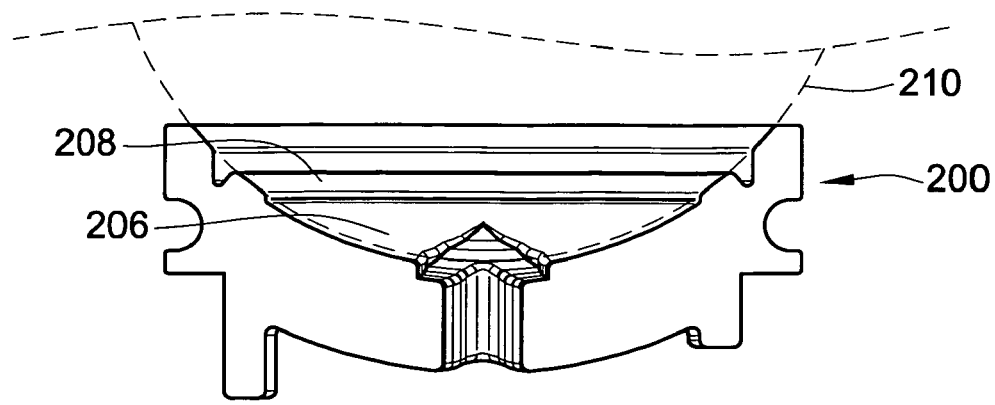

In the second flow characterizing device 200, the segmented flow characterizing channel 202, as outlined by a bold line in FIG. 5C, includes a segmented flow characterizing surface 204 having a first segment 206 formed by a recessed portion of a land surface 208. The recessed portion 206 is spaced a lesser distance away 'g206' from a datum surface 210, defined by the remainder of the land surface 208 of the second flow characterizing bearing 200, than other segments 212 of the segmented flow characterizing surface 204 which are spaced at various distances 'g212' away from the datum 210. The first segment 206 thus provides an additional transversely facing flow area 214, at all open angular positions of the valve member 14, and functions as a controlled "leakage clearance". It is contemplated that the first segment 206 might be spaced a distance g206 of 0.008 inches away from the datum surface 210, in a ½ or ¾ inch ball valve, for example, to thereby provide a clearance between the land surface 206 and the valve member 14 that is considerably larger than the tight tolerances of 0.0005 to 0.0015 typically utilized in the prior art for the fit between a characterizing device and the valve member.

It will also be noted, as will be seen by comparing FIGS. 4G and 5C, that the apex 216 formed by the second and subsequent segments 212 of the axially facing, transversely extending, segmented flow characterizing surface 204 of the second flow characterizing bearing 200 is positioned radially inward from the outer periphery (outlined by bold line in FIG. 5C) of the flow characterizing channel 202, at such a distance that, when the valve 10 first begins to open, with controlling edge 56 at position A as shown in FIG. 5C, all of the flow passing through the valve 10 passes through the additional transversely facing flow area 214. In this manner, the performance of the valve is improved in the range of 0 to 20 degrees of angular opening.

At low angular positions of the valve member 14, the change in flow area per degree of angular rotation of the valve member 14 is primarily the product the constant distance g206 and the arc length of the controlling edge 56 extending over the segmented flow characterizing channel 202. To put it more simply, the change in the additional transversely facing flow area 214 is a function of the arc length of the controlling edge 56 extending over the first recessed area 206 of the segmented flow characterizing channel 202, i.e. the length of the controlling edge 56 within the bold-lined circle shown on FIG. 5C.

As the valve member 14 is rotated further from the fully closed position, to a position inboard of the apex 216, such as the position indicated at B in FIG. 5C, for example, the flow area is the arithmetic sum of the additional transversely facing flow area 214, at the position aligned with the controlling edge 56 of the valve member 14, and the transversely facing area of the segmented channel 202 formed below the additional area 214 by the segment 212 that is aligned with the controlling edge 56. As the valve member is rotated still further from the fully closed position, to the position indicated at C in FIG. 5C, for example, an axially facing flow area 220 of the through hole portion 222 of the flow characterizing channel 202 is uncovered, and the total flow area is becomes the arithmetic sum of the axially facing flow area 220, the additional transversely facing flow area 214, at the position aligned with the controlling edge 56 of the valve member 14, minus the arc length of the controlling edge 56 across the axially facing flow area 220, and the transversely facing area of the segmented channel 202 formed below the additional area 214 and outside of an axial projection of the axially facing flow area 222 by the portions of the segment 212 that is aligned with the controlling edge 56.

Figure 5F:
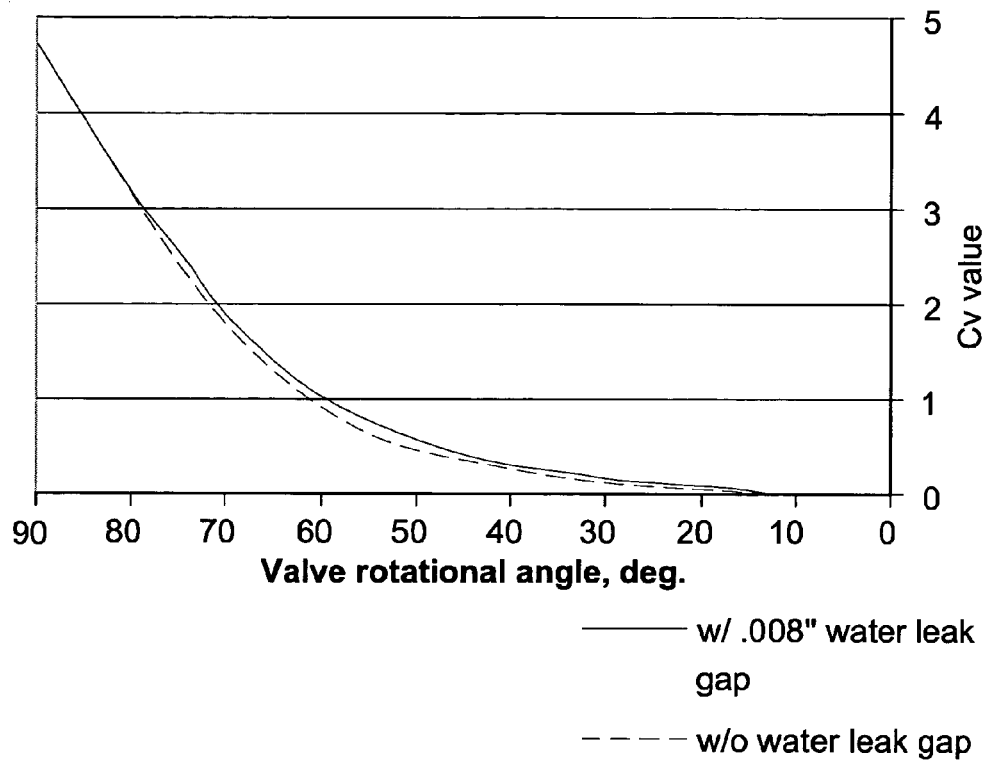
Figure 5E:
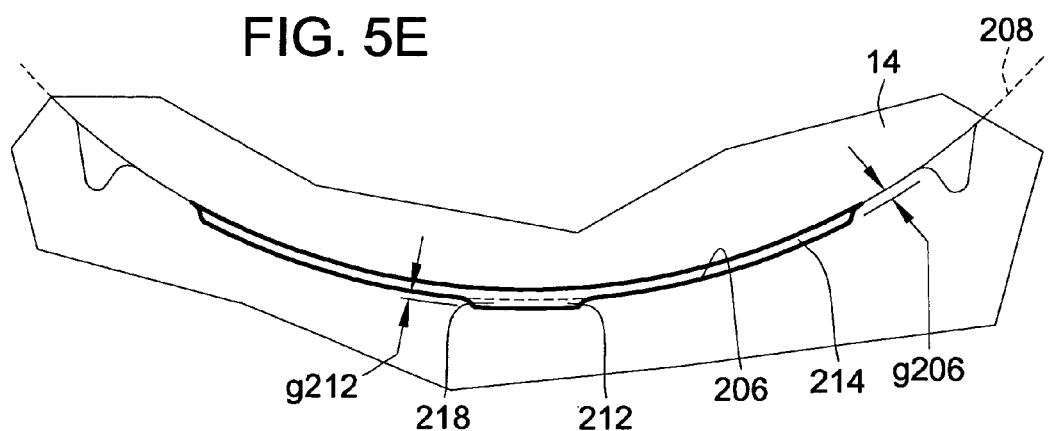

The inventor has discovered that in valves providing a full flow rating greater than about 45 percent of full port Cv, for example, a controlled leakage path provided by recessing a portion of the land surface, in the manner described above according to the invention, generally provides certain advantages in valve performance. In addition to improved rangeability at valve rotational angles between 0 and 20 degrees, as described above, these advantages include reducing torque requirements for turning the valve member. As shown in FIG. 5F, for the 4.7 Cv full flow valve, the characteristic curve for flow characterizing device with a controlled clearance of 0.008 inches, as shown by the dashed line, is almost identical to the characteristic curve for flow characterizing device without a controlled clearance of 0.008 inches, as shown by the solid line, with improved performance being provided at low angular rotations and significantly less torque being required for repositioning the valve member.

As shown by the dashed line in FIG. 4P, however, for valve sizes smaller than about 25 percent of full port Cv, such as the 0.74 Cv valve discussed above in relation to the first flow characterizing device 100 according to the invention, including the controlled leakage path provided by recessing a portion of the land surface, in the manner described above in relation to the second characterizing bearing 200, may detrimentally affect valve performance, depending upon the operational requirements for the valve. For valves providing a full flow rating between about 50 percent and 25 percent of full flow Cv, a controlled leakage path according to the invention may, or may not, provide advantages, depending upon the particular requirements for the valve.

FIGS. 6A–6D illustrate a third exemplary embodiment of a flow characterizing device 300, according to the invention, for providing a maximum flow rating of 7.4 Cv in the ball valve of FIGS. 1 and 2. In general, the third flow characterizing device 300 is constructed in the same manner as the first and second flow characterizing bearings 100, 200, as described above in relation to FIGS. 4A–4P, and FIGS. 5A–5E.

Figure 6B:
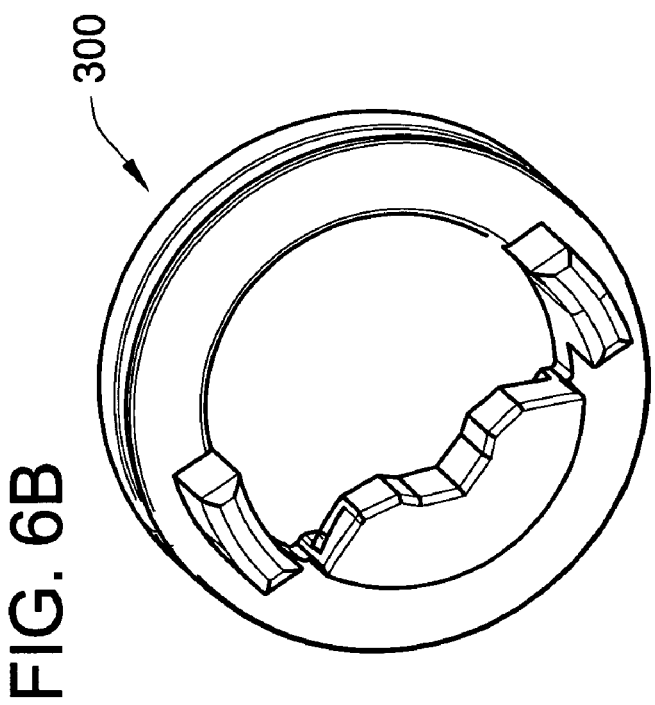
Figure 6A:
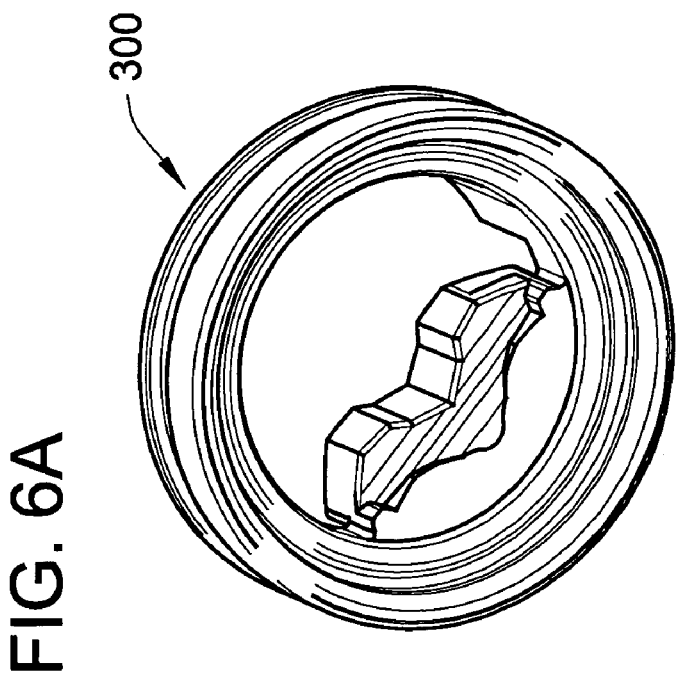
Figure 6C:
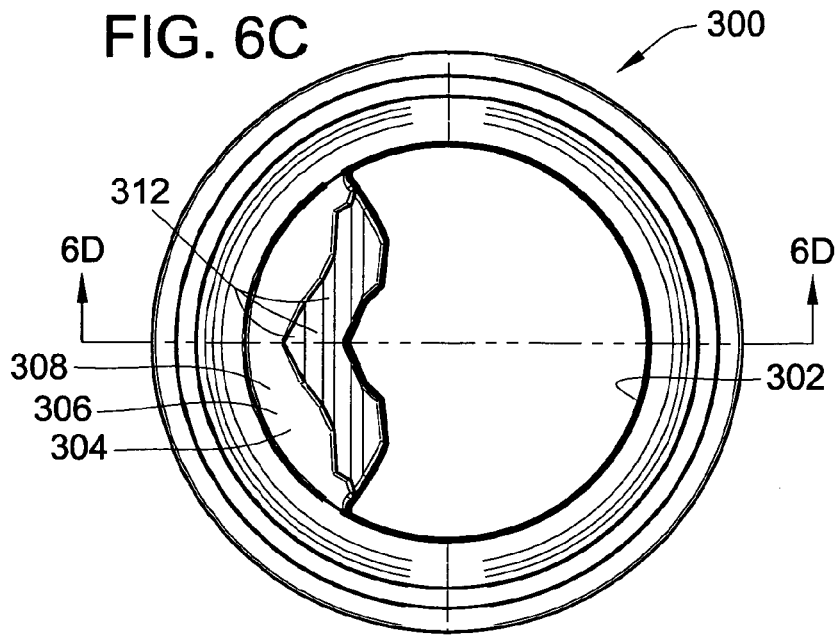
Figure 6D:
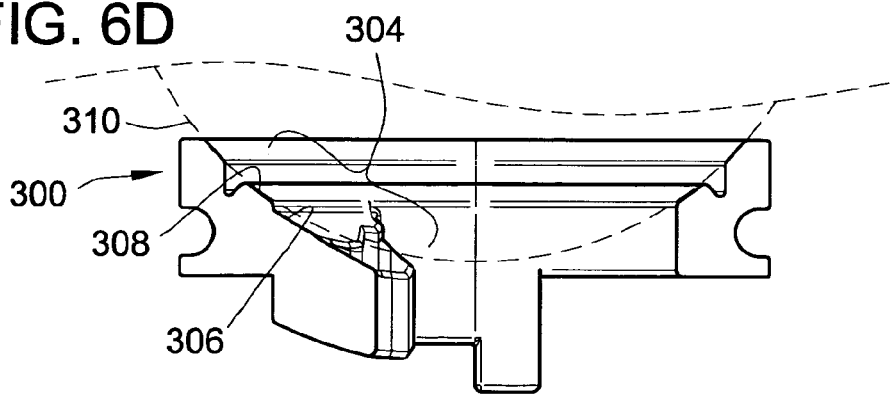
Figure 6D:
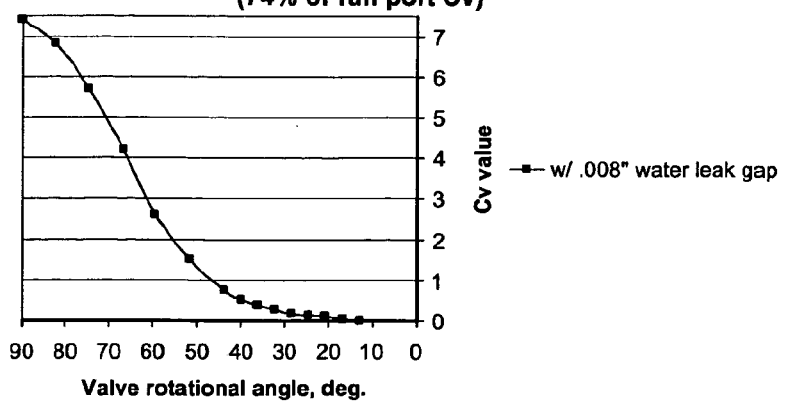

As was the case in the second flow characterizing device 200, the segmented flow characterizing channel 302, as outlined by a bold line in FIG. 6C, also includes a segmented flow characterizing surface 304 having a first segment 306 formed by a recessed portion of a land surface 308, which is spaced a lesser distance away from a datum surface 310, defined by the remainder of the land surface 308 of the third flow characterizing bearing 300, than other segments 312 of the segmented flow characterizing surface 304. As was the case for the second flow characterizing bearing 200 described above, it is contemplated that the first segment 306 of the third flow characterizing bearing 300 might be spaced a distance of 0.008 inches away from the datum surface 310, in a ½ or ¾ inch ball valve, for example, to thereby provide a clearance between the land surface 306 and the valve member 14 that is considerably larger than the tight tolerances of 0.0005 to 0.0015 typically utilized in the prior art for the fit between a characterizing device and the valve member.

FIG. 6E graphically illustrates the flow characteristic provided by the third flow characterizing bearing 300. Those skilled in the art will note that the third characterizing bearing only provides true equal-percentage flow in the range of about 20 to 50 degrees of angular rotation from the fully closed position. This occurs as a result of the 7.4 Cv fully open flow capability of the third characterizing bearing being larger than 50% of the full flow 10.0 Cv rating of the ½ to ¾ inch diameter ball valve used in describing the exemplary embodiments.

Stated more simply, where the desired fully open Cv rating of any flow characterizing device is a fairly large percentage of the full flow Cv rating for a flowpath of a given nominal diameter, in the prior art as well as according to the invention, there comes a point in the operation of the flow characterizing device when the through-hole portion of the characterizing device becomes so large, in comparison to the nominal diameter of the flowpath, that the characterizing device is no longer capable of restricting the flow in a manner that can produce an equal percentage flow characteristic. In such instances, if it is desired to have an equal percentage characteristic over a greater portion of the characteristic curve, it will be necessary to increase the nominal diameter of the flowpath so that the desired fully open Cv rating of the characterizing device is less than about 50% of the full port Cv of the flowpath. Where such design requirements are encountered, an apparatus and/or method, according to the invention, provide significant advantages over the prior art in facilitating the design and production of a characterizing device providing a desired flow characteristic curve.

Where the fully open Cv rating of a characterizing device is greater than 50% of the full flow Cv rating of the flowpath, as specifically illustrated by the third exemplary embodiment of a characterizing insert 300 described above, experience has shown that recessing a portion of the land surface to provide a controlled leakage clearance between the characterizing surface and the valve member, in the manner described above, facilitates manufacture, improves performance of the valve, and reduces the torque required for turning the valve member in the characterizing bearing.

Figure 9:
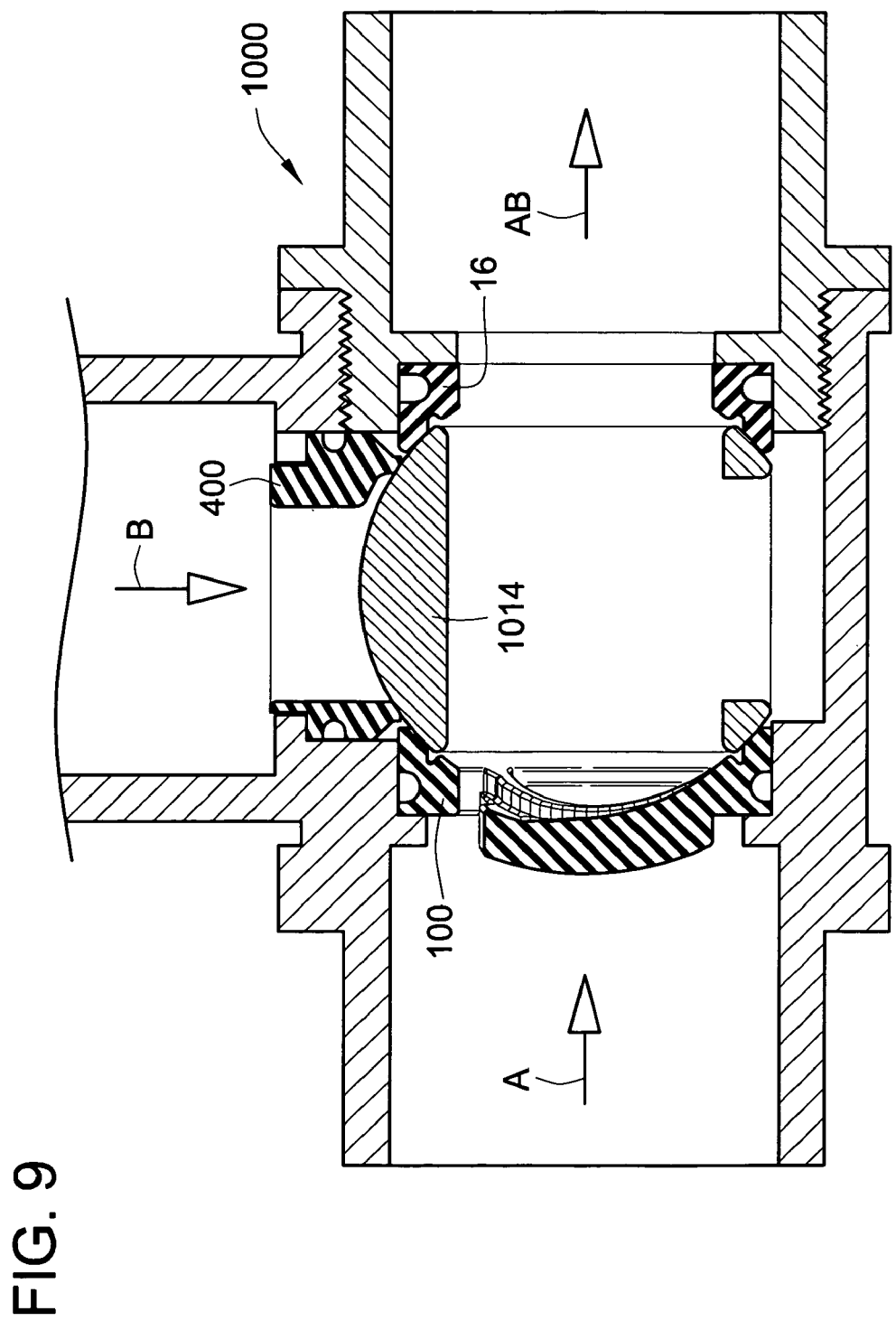
FIG. 9 is a horizontal cross section, looking along an axis of rotation of the valve member, of a three-way mixing valve, according to the invention, having A, B, and AB ports, showing the valve member positioned to completely block flow from the B port to the AB port, and allowing maximum rated flow from the A port to the AB port.
Figure 10:
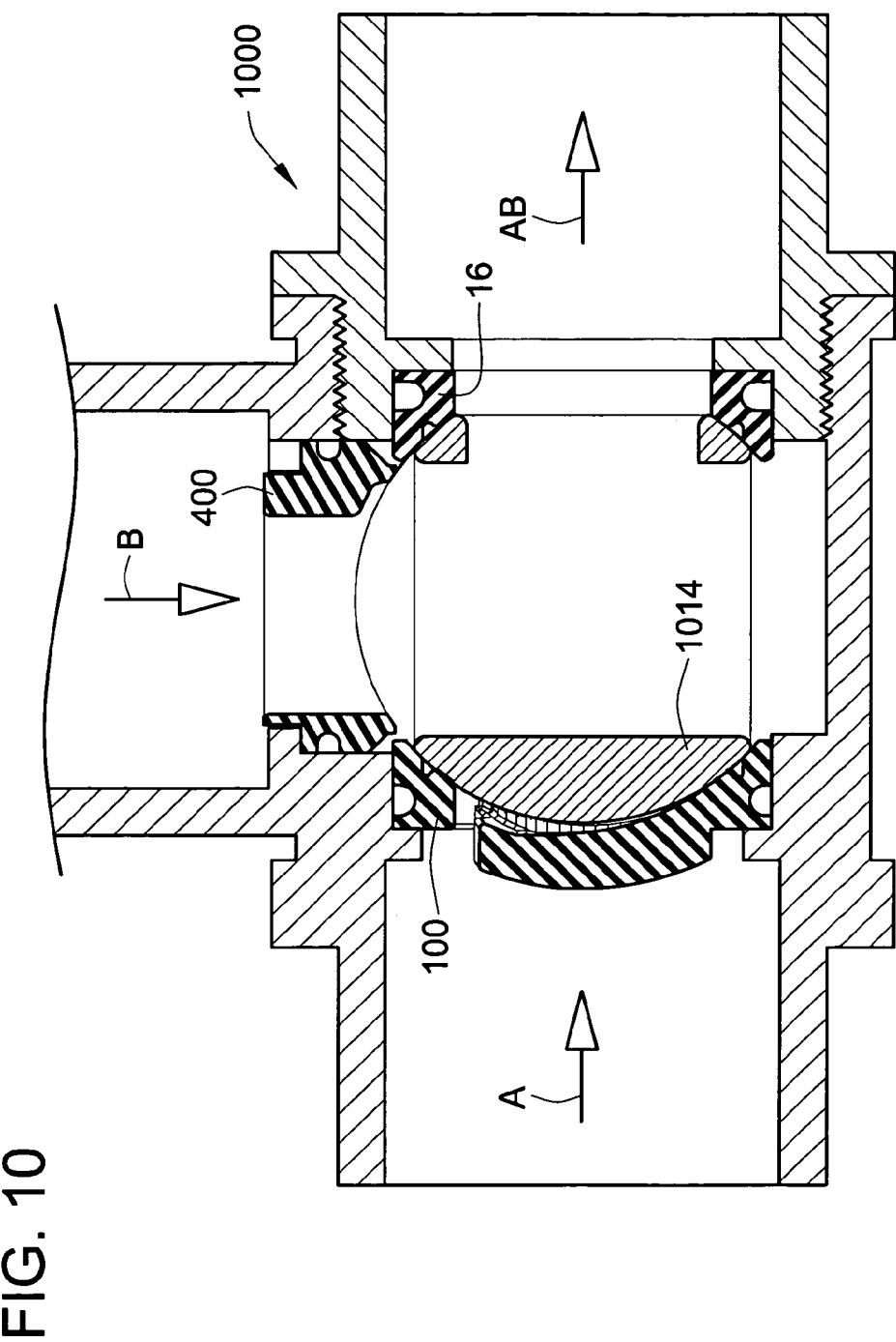
FIG. 10 is a horizontal cross section, looking along an axis of rotation of the valve member, of the three-way mixing valve of FIG. 9, showing the valve member positioned to completely block flow from the A port to the AB port, and allowing maximum flow from the B port to the AB port.

Those having skill in the art will recognize that, although the exemplary embodiments specifically described above are all two-way ball valves, the invention may also be practiced with three-way ball valves, of the type shown in FIGS. 9 and 10, for example, where the flowpath includes an A passage, an AB passage, and a B passage, and the outer surface of the valve member includes an A face, an AB face, and a B face of the valve member, each having a respective controlling edge thereof. Such three-way valves may include, for example, a first flow characterizing device, according to the invention, attached to the housing adjacent one of the A, B, or AB faces of the valve member, and a second flow characterizing device, according to the invention, attached to the housing adjacent another of the A,B, or AB faces of the valve member.

Figure 11B:
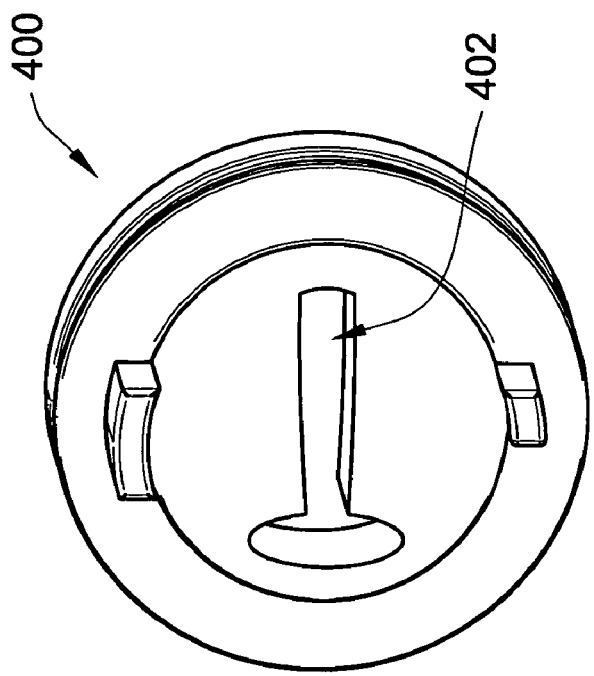
FIGS. 11A and 11B, respectively, are perspective views of the inner and outer sides of a flow characterizing bearing, according to the invention, for use in the B port of the three-way valve of FIGS. 9 and 10, in conjunction with the 0.74 Cv flow characterizing bearing of FIGS. 4A–4P installed in the A port.
Figure 11A:
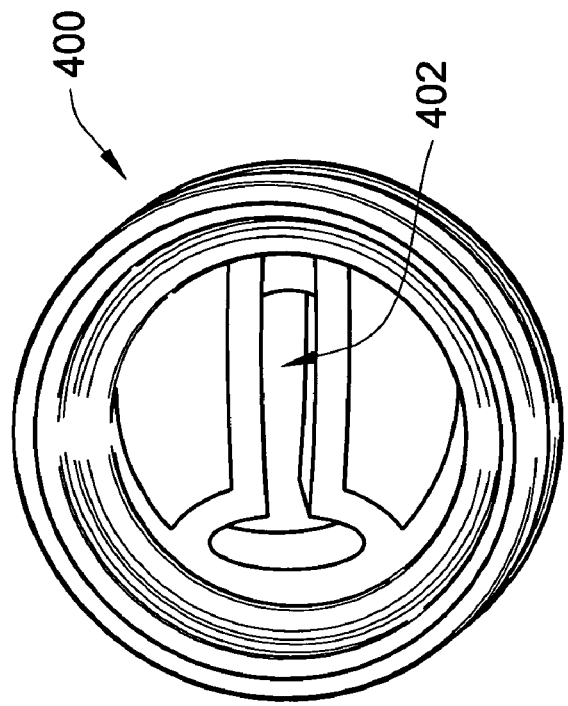

For example, FIGS. 11A and 11B show a characterizing bearing 400, in accordance with the invention, for use in the B port of the ½ to ¾ inch nominal diameter mixing valve shown in FIGS. 9 and 10, in conjunction with the 0.74 Cv first characterizing bearing 100 installed in the A port, and the full flow bearing 16 as described above installed in the AB port. In such a mixing valve, it is desirable that an equal percentage flow characteristic be provided from the AB port at angular positions of the valve member 1014 where the B port is completely closed, as shown in FIG. 11, and that a constant flow rate be provided from the AB port at angular positions where the B port is fully or partly open and supplying fluid to the valve 1000, as shown in FIG. 10 or at intermediate angular positions approaching the position shown in FIG. 10 where the B port is at least partially open.

Figure 12:
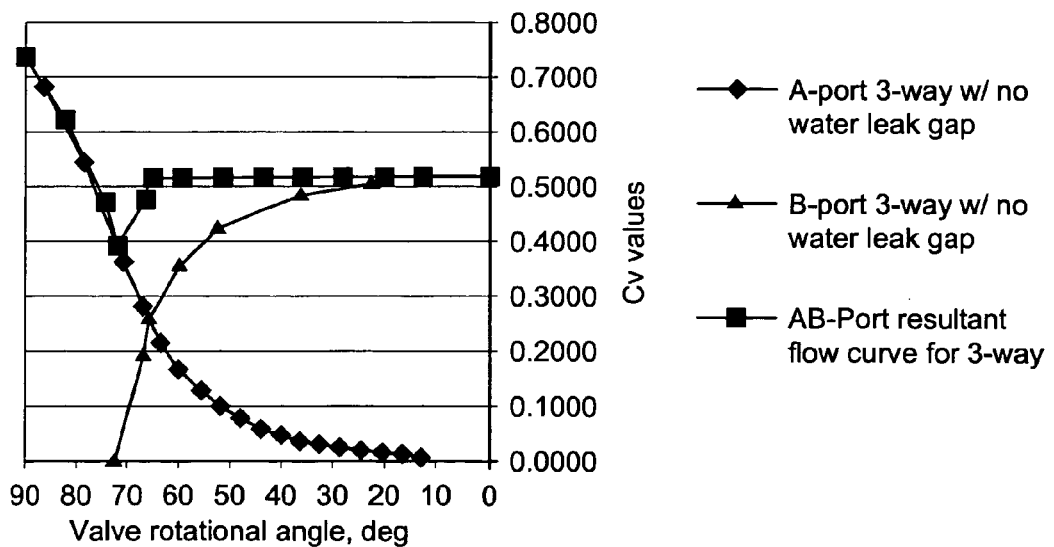
FIG. 12 is a graph showing the performance of the three way valve of FIGS. 9 and 10 with the flow characterizing bearings of FIGS. 4A–4P and 11A–11B installed in the A and B ports respectively.

As shown in FIG. 12, the segmented keyhole-shaped opening 402 in the characterizing bearing 400, developed in accordance with the invention, in conjunction with the first characterizing bearing 100, provide the desired mixing valve performance of having an equal percentage flow characteristic from the AB port at angular positions of the valve member 1014 where the B port is completely closed, and a constant flow rate from the AB port at angular positions where the B port is fully or partly open and supplying fluid to the valve 1000.

Figure 13B:
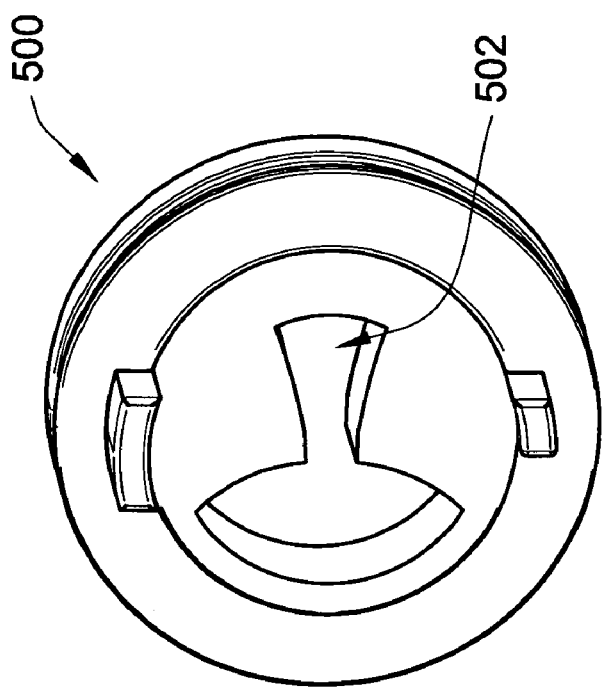
FIGS. 13A and 13B, respectively, are perspective views of the inner and outer sides of a flow characterizing bearing, according to the invention, for use in the B port of the three-way valve of FIGS. 9 and 10, in conjunction with the 4.7 Cv flow characterizing bearing of FIGS. 5A–5F installed in the A port.
Figure 13A:
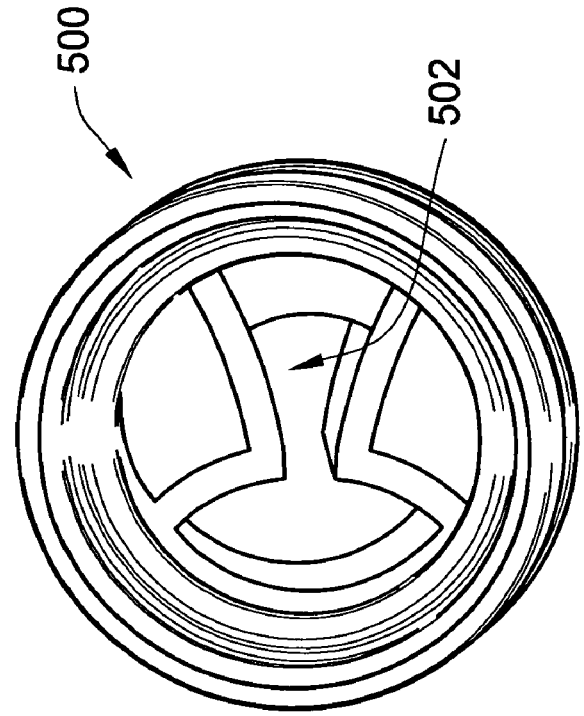

FIGS. 13A and 13B are inside and outside perspective views, respectively, of another embodiment of a flow characterizing bearing 500, according to the invention, for providing the desired flow performance in the mixing valve of FIGS. 9 and 10, having a fully open flow rating of 4.7 Cv, with the characterizing bearing 500 installed in the B port of the valve 1000, and the second flow characterizing bearing 200 installed in the A port of the valve 1000. The characterizing bearing 500 shown in FIGS. 13A and 13B has a different specially-shaped opening 502 than the characterizing bearing 400 used to provide a valve having a fully open rating of 0.74 Cv. Specifically, the open area of the opening 502 in the bearing 500 of FIGS. 13A–13B is larger than the open area of the opening 402 in the characterizing bearing 402 shown in FIGS. 11A–11B, to provide the higher fully open flow rating of 4.7 Cv.

Those having skill in the art will further recognize that, although the invention has been described herein with respect to modifying a valve characteristic in a ball valve, through use of a segmented flow characterizing channel which is stationary in the flowpath of the valve and a controlling edge which is selectively movable with respect to the segmented flow characterizing channel, the invention may also be applied for characterizing flow through flowpaths differing significantly from the flowpath in a ball valve. Those having skill in the art will further recognize that, in practicing the invention, either or both of the segmented flow characterizing channel and the controlling edge may be selectively moved relative to one another in the flowpath.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flow characterizing device, adapted for placement in a flowpath adjacent to a movable valve member, but not including the valve member or the flowpath, for modifying fluid flow through the flowpath, where the flowpath defines a longitudinal axis thereof and the valve member includes an outer surface thereof having a controlling edge which is selectively movable, along a path extending transverse to the longitudinal axis, between a fully open and a fully closed position of the valve member in the flowpath, the flow characterizing device comprising:

a body, defining a longitudinal centerline of the flow characterizing device that extends substantially coincident with the longitudinal axis of the flowpath when the flow characterizing device is installed in the flowpath, and a transverse axis of the flow characterizing device that extends substantially coincident with the path of the controlling edge when the flow characterizing device is installed in the flowpath, the body also defining a datum surface of the flow characterizing device corresponding to the outer surface of the valve member when the flow characterizing device is installed in the flowpath, and inner and outer surfaces of the flow characterizing device disposed in a spaced relationship along the centerline of the flow characterizing device;

the inner surface of the flow characterizing device defining a land surface thereof conforming to a portion of the datum surface and contoured to bear against the outer surface of the valve member, for forming a substantially fluid-tight seal between the land surface and the outer surface of the valve member;

the inner surface of the flow characterizing device further defining a segmented flow characterizing channel therein bounded at least partially by the land surface and the datum surface and including three or more discrete segments thereof, at least one of which is a through-hole extending through the body for providing fluid communication between the inner and outer surfaces of the flow characterizing device, and the other two of the three or more discrete segments being connected in fluid communication with the through-hole, with each discrete segment opening through the datum surface, and, when the controlling edge of the valve member is aligned therewith, providing a uniquely sized, discrete, flow area at least partially bounded by the datum surface, for controlling a flow of fluid through the flowpath.

2. The flow characterizing device of claim 1, wherein at least one of the other two or more discrete segments includes a substantially axially facing wall thereof extending transversely to centerline of the flow controlling device, such that the flow area provided by the at least one of the other two or more discrete segments, when the controlling edge is aligned therewith is a transversely facing flow area for controlling a flow of fluid through the flowpath.

3. The flow characterizing device of claim 2, wherein at least two of the other two or more discrete segments include substantially axially facing walls thereof extending transversely to centerline of the flow controlling device.

4. The flow characterizing device of claim 1, wherein the discrete segments are oriented in a series fluid circuit relationship to one another, and sized such that, when the flow characterizing device is installed in the flowpath and controlling edge of the valve member is aligned with a given one of the segments, substantially all of a flow of fluid through the flowpath will pass through and be controlled by the uniquely sized, discrete, flow area provided by the given segment.

5. The flow characterizing device of claim 1, wherein two or more given segments of the three or more segments are oriented in a parallel fluid circuit arrangement to one another, such that when the flow characterizing device is installed in the flowpath and the controlling edge of the valve member is concurrently aligned with all of the given segments, substantially all of a flow of fluid through the flowpath will pass through and be controlled by the uniquely sized, discrete, flow areas provided by all of the given segments acting in a parallel fluid flow relationship.

6. The flow characterizing device of claim 5, wherein the given segments are oriented in a parallel-series fluid relationship to the through-hole in the flow characterizing channel, such that a summation of flows through the given segments passes through the through-hole.

7. The flow characterizing device of claim 1, wherein two or more given segments of the three or more segments are oriented in a parallel fluid circuit arrangement to one another, such that when the flow characterizing device is installed in the flowpath and the controlling edge of the valve member is aligned with any one of the two or more given segments, substantially all of a flow of fluid through the flowpath will pass through and be controlled by the uniquely sized, discrete, flow areas provided by all of the given segments acting in a parallel fluid flow relationship.

8. The flow characterizing device of claim 7 wherein at least one of the two or more given segments includes a substantially axially facing wall thereof extending transversely to centerline of the flow controlling device, such that the flow area provided by the at least one of the two or more given segments, when the flow characterizing device is installed in the flowpath and the controlling edge is aligned therewith, provides a transversely facing flow area for controlling a flow of fluid through the flowpath.

9. The flow characterizing device of claim 1, wherein:
   at least one of the other two or more discrete segments includes a substantially axially facing wall thereof extending transversely to centerline of the flow controlling device, such that the flow area provided by the at least one of the other two or more discrete segments, when the controlling edge is aligned therewith provides a transversely facing flow area for controlling a flow of fluid through the flowpath; and
   the segmented flow characterizing channel extends along the transverse axis of the flow characterizing device, with the through-hole being disposed substantially at one end of the channel and the at least one segment, having a substantially axially facing wall thereof extending transversely to the centerline, being disposed at an opposite end of the channel.

10. The flow characterizing device of claim 9, wherein:
    the segmented flow characterizing channel includes a first and a second segment thereof, with the one segment of claim 9 forming the first segment; and
    the segmented flow characterizing channel further includes a substantially axially facing flow characterizing surface having adjacent first and second sections thereof extending at least partially across the flowpath and having discrete leading and trailing edges thereof that form a discontinuity at a juncture of the first and second segments of the flow characterizing channel and are configured for having the controlling edge selectively aligned therewith.

11. The flow characterizing bearing of claim 10, wherein the first and second sections of the flow characterizing surface are disposed at different distances from the datum surface.

12. The flow characterizing device of claim 10, wherein the first and second segments, form first and second transversely facing flow areas of different respective sizes, to thereby provide a stepped change in transversely facing flow area at the juncture between the first and second segments.

13. The flow characterizing device of claim 12, wherein the second transversely facing flow area is larger than the first transversely facing flow area.

14. The flow characterizing device of claim 1, wherein the through-hole includes adjacent first and second discrete segments thereof, without a separating wall therebetween, and having discrete sidewalls discontinuously joined to one another at a juncture configured for having the controlling edge selectively aligned therewith at a predetermined location along the transverse axis.

15. The flow characterizing device of claim 14, wherein the first and second segments of the through-hole form first and second axially facing flow areas of different respective sizes, to thereby provide a stepped change in axially facing flow area at the juncture between the first and second segments.

16. The flow characterizing device of claim 1, wherein the body further defines a bearing surface adapted for bearing against the outer surface of the valve member, when the valve member and flow characterizing device are installed in the flow passage.

17. The flow characterizing device of claim 16, wherein the bearing surface is formed by a portion of the land surface.

18. The flow characterizing device of claim 16, wherein the bearing surface includes a groove therein, dividing the bearing surface into a first and a second bearing surface that bear against the outer surface of the valve member, when the valve member and characterizing device are installed in the housing.

19. The flow characterizing device of claim 18, wherein the first and second bearing surfaces provide a substantially fluid-tight seal against the outer surface of the valve member, when the valve member and characterizing device are installed in the housing.

20. The flow characterizing device of claim 19, wherein the groove is adapted for holding a lubricant, for reducing friction between the outer surface of the valve member and the first and second bearing surfaces of the characterizing device.

21. The flow characterizing device of claim 1, wherein the land surface includes one or more recessed areas therein, spaced a clearance distance from the datum, to thereby reduce frictional drag between the land surface and the valve member.

22. A ball valve, comprising:
    a valve housing defining a flowpath and a longitudinal axis of the flowpath;
    a valve member mounted in the flowpath for selective rotation about an axis of rotation extending through the longitudinal axis of the flowpath, the valve member having an outer surface thereof defining a controlling edge which is selectively movable along a path extending substantially transverse to both the longitudinal axis and the axis of rotation between a fully open and a fully closed position of the valve member in the flowpath as the valve member is rotated about the rotational axis; and
    a flow characterizing device attached to the valve housing in the flowpath adjacent to the valve member, for modifying fluid flow through the flowpath, the flow characterizing device comprising:
    a body, defining a longitudinal centerline of the flow characterizing device that extends substantially coincident with the longitudinal axis of the flowpath, and a transverse axis of the flow characterizing device that extends substantially coincident with the path of the controlling edge, the body also defining a datum surface of the flow characterizing device corresponding to the outer surface of the valve member, and inner and outer surfaces of the flow characterizing device disposed in a spaced relationship along the centerline of the flow characterizing device;
    the inner surface of the flow characterizing device defining a land surface thereof conforming to a portion of the datum surface and contoured to bear against the outer surface of the valve member, for forming a substantially fluid-tight seal between the land surface and the outer surface of the valve member;

the inner surface of the flow characterizing device further defining a segmented flow characterizing channel therein bounded at least partially by the land surface and the datum surface and including three or more discrete segments thereof, at least one of which is a through-hole extending through the body for providing fluid communication between the inner and outer surfaces of the flow characterizing device, and the other two of the three or more discrete segments being connected in fluid communication with the through-hole, with each discrete segment opening through the datum surface, and, when the controlling edge of the valve member is aligned therewith, providing a uniquely sized, discrete, flow area at least partially bounded by the datum surface, for controlling a flow of fluid through the flowpath.

23. The ball valve of claim 22, wherein at least one of the other two or more discrete segments of the flow characterizing device includes a substantially axially facing wall thereof extending transversely to centerline of the flow controlling device, such that the flow area provided by the at least one of the other two or more discrete segments, when the controlling edge is aligned therewith is a transversely facing flow area for controlling a flow of fluid through the flowpath.

24. The ball valve of claim 23, wherein at least two of the other two or more discrete segments of the flow characterizing device include substantially axially facing walls thereof extending transversely to centerline of the flow controlling device.

25. The ball valve of claim 22, wherein the discrete segments of the flow characterizing device are oriented in a series fluid circuit relationship to one another, and sized such that, when the controlling edge of the valve member is aligned with a given one of the segments, substantially all of a flow of fluid through the flowpath passes through and be controlled by the uniquely sized, discrete, flow area provided by the given segment.

26. The ball valve of claim 22, wherein two or more given segments of the three or more segments of the flow characterizing device are oriented in a parallel fluid circuit arrangement to one another, such that when the controlling edge of the valve member is concurrently aligned with all of the given segments, substantially all of a flow of fluid through the flowpath would pass through and be controlled by the uniquely sized, discrete, flow areas provided by all of the given segments acting in a parallel fluid flow relationship.

27. The ball valve of claim 26, wherein the given segments of the flow characterizing device are oriented in a parallel-series fluid relationship to the through-hole in the flow characterizing channel, such that a summation of flows through the given segments passes through the through-hole.

28. The ball valve of claim 22, wherein two or more given segments of the three or more segments of the flow characterizing device are oriented in a parallel fluid circuit arrangement to one another, such that when the controlling edge of the valve member is aligned with any one of the two or more given segments, substantially all of a flow of fluid through the flowpath passes through and is controlled by the uniquely sized, discrete, flow areas provided by all of the given segments acting in a parallel fluid flow relationship.

29. The ball valve of claim 28 wherein at least one of the two or more given segments of the flow characterizing device includes a substantially axially facing wall thereof extending transversely to centerline of the flow controlling device, such that the flow area provided by the at least one of the two or more given segments, when the controlling edge is aligned therewith provides a transversely facing flow area for controlling a flow of fluid through the flowpath.

30. The ball valve of claim 22, wherein:
at least one of the other two or more discrete segments of the flow characterizing device includes a substantially axially facing wall thereof extending transversely to centerline of the flow controlling device, such that the flow area provided by the at least one of the other two or more discrete segments, when the controlling edge is aligned therewith provides a transversely facing flow area for controlling a flow of fluid through the flowpath; and
the segmented flow characterizing channel extends along the transverse axis of the flow characterizing device, with the through-hole being disposed substantially at one end of the channel and the at least one segment, having a substantially axially facing wall thereof extending transversely to the centerline, being disposed at an opposite end of the channel.

31. The ball valve of claim 30, wherein:
the segmented flow characterizing channel of the flow characterizing device includes a first and a second segment thereof, with the one segment of claim 30 forming the first segment; and
the segmented flow characterizing channel of the flow characterizing device further includes a substantially axially facing flow characterizing surface having adjacent first and second sections thereof extending at least partially across the flowpath and having discrete leading and trailing edges thereof that form a discontinuity at a juncture of the first and second segments of the flow characterizing channel and are configured for having the controlling edge selectively aligned therewith.

32. The ball valve of claim 31, wherein the first and second sections of the flow characterizing surface of the flow characterizing device are disposed at different distances from the datum surface.

33. The ball valve of claim 31, wherein the first and second segments of the flow characterizing device, form first and second transversely facing flow areas of different respective sizes, to thereby provide a stepped change in transversely facing flow area at the juncture between the first and second segments.

34. The ball valve of claim 33, wherein the second transversely facing flow area is larger than the first transversely facing flow area.

35. The ball valve of claim 22, wherein the through-hole of the flow characterizing device includes adjacent first and second discrete segments thereof, without a separating wall therebetween, and having discrete sidewalls discontinuously joined to one another at a juncture configured for having the controlling edge selectively aligned therewith at a predetermined location along the transverse axis.

36. The ball valve of claim 35, wherein the first and second segments of the through-hole of the flow characterizing device form first and second axially facing flow areas of different respective sizes, to thereby provide a stepped change in axially facing flow area at the juncture between the first and second segments.

37. The ball valve of claim 22, wherein the body of the flow characterizing device further defines a bearing surface adapted for bearing against the outer surface of the valve member.

38. The ball valve of claim 37, wherein the bearing surface of the flow characterizing device is formed by a portion of the land surface.

39. The ball valve of claim 37, wherein the bearing surface of the flow characterizing device includes a groove therein, dividing the bearing surface into a first and a second bearing surface that bear against the outer surface of the valve member.

40. The ball valve of claim 39, wherein the first and second bearing surfaces of the flow characterizing device provide a substantially fluid-tight seal against the outer surface of the valve member.

41. The ball valve of claim 40, wherein the groove is adapted for holding a lubricant, for reducing friction between the outer surface of the valve member and the first and second bearing surfaces of the characterizing device.

42. The ball valve of claim 22, wherein the land surface of the flow characterizing device includes one or more recessed areas therein, spaced a clearance distance from the datum, to thereby reduce frictional drag between the land surface and the valve member.

43. The ball valve of claim 22, wherein the ball valve is a three-way valve with the flowpath including an A passage, an AB passage, and a B passage, and the outer surface of the valve member includes an A face, an AB face, and a B face of the valve member, each having a respective controlling edge thereof, and the ball valve further comprises:
a first flow characterizing device, according to claim 22, attached to the housing adjacent one of the A, B, or AB faces of the valve member; and
a second flow characterizing device, according to claim 22, attached to the housing adjacent another of the A,B, or AB faces of the valve member.

44. The ball valve of claim 43, wherein:
the A port is adapted for connection to a first fluid source, and the B port is adapted for connection to a second fluid source;
the first characterizing device is installed in the A port, and the second characterizing device is installed in the B port; and
the first and second characterizing devices are configured for providing a substantially equal percentage flow characteristic from the AB port at angular positions of the valve member where the B port is completely closed, and a substantially constant flow rate from the AB port at angular positions of the valve member where the B port is fully or partly open.

45. A method for modifying fluid flow through a flowpath having a valve member therein, where the flowpath defines a longitudinal axis thereof and the valve member includes an outer surface thereof having a controlling edge which is selectively movable, along a path extending transverse to the longitudinal axis, between a fully open and a fully closed position of the valve member in the flowpath, the method comprising inserting a flow characterizing device into the flowpath adjacent the valve member, wherein the flow characterizing device includes:
a body, defining a longitudinal centerline of the flow characterizing device that extends substantially coincident with the longitudinal axis of the flowpath when the flow characterizing device is installed in the flowpath, and a transverse axis of the flow characterizing device that extends substantially coincident with the path of the controlling edge when the flow characterizing device is installed in the flowpath, the body also defining a datum surface of the flow characterizing device corresponding to the outer surface of the valve member when the flow characterizing device is installed in the flowpath, and inner and outer surfaces of the flow characterizing device disposed in a spaced relationship along the centerline of the flow characterizing device;
the inner surface of the flow characterizing device defining a land surface thereof conforming to a portion of the datum surface and contoured to bear against the outer surface of the valve member, for forming a substantially fluid-tight seal between the land surface and the outer surface of the valve member;
the inner surface of the flow characterizing device further defining a segmented flow characterizing channel therein bounded at least partially by the land surface and the datum surface and including three or more discrete segments thereof, at least one of which is a through-hole extending through the body for providing fluid communication between the inner and outer surfaces of the flow characterizing device, and the other two of the three or more discrete segments being connected in fluid communication with the through-hole, with each discrete segment opening through the datum surface, and, when the controlling edge of the valve member is aligned therewith, providing a uniquely sized, discrete, flow area at least partially bounded by the datum surface, for controlling a flow of fluid through the flowpath.

46. A method for modifying fluid flow through a flowpath defining a longitudinal axis thereof, the method comprising:
controlling fluid flow through the flowpath with a segmented characterizing channel and a controlling edge disposed adjacent the segmented characterizing channel, by placing the segmented characterizing channel and controlling edge into the flowpath and adjusting the relative positions of the segmented characterizing channel and the controlling edge with respect to one another;
the segmented flow characterizing channel including three or more discrete segments thereof, at least one of which is a through-hole, with at least two or more of the three or more discrete segments being connected in fluid communication with the through-hole along a channel axis extending transversely to the longitudinal axis of the flowpath, with each of the at least two or more segments including a substantially axially facing wall thereof extending transversely to centerline of the flow controlling device, such that the flow area provided by each one of the at least two or more discrete segments, when the controlling edge is aligned therewith is a transversely facing flow area for controlling a flow of fluid through the flowpath;
at least one of the controlling edge and the segmented flow characterizing channel being selectively movable along the channel axis.

47. An apparatus for modifying fluid flow through a flowpath defining a longitudinal axis thereof, the apparatus comprising:
a segmented characterizing channel disposed in the flowpath, and a controlling edge disposed in the flowpath adjacent the segmented characterizing channel;
the segmented flow characterizing channel including three or more discrete segments thereof, at least one of which is a through-hole, with at least two or more of the three or more discrete segments being connected in fluid communication with the through-hole along a channel axis extending transversely to the longitudinal axis of the flowpath, with each of the at least two or more segments including a substantially axially facing wall thereof extending transversely to centerline of the flow controlling device, such that the flow area provided by each one of the at least two or more discrete segments, when the controlling edge is aligned therewith is a transversely facing flow area for controlling a flow of fluid through the flowpath;

at least one of the controlling edge and the segmented flow characterizing channel being selectively movable along the channel axis.

* * * * *